(12) United States Patent
Waelbroeck et al.

(10) Patent No.: US 8,635,144 B2
(45) Date of Patent: *Jan. 21, 2014

(54) CONFIDENTIAL BLOCK TRADING SYSTEM AND METHOD

(75) Inventors: Henri Waelbroeck, Scarsdale, NY (US); Fred J. Federspiel, Larchmont, NY (US); John Lopez, Nesconset, NY (US)

(73) Assignee: ITG Software Solutions, Inc., Culver City, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 12/692,147

(22) Filed: Jan. 22, 2010

(65) Prior Publication Data
US 2010/0121759 A1    May 13, 2010

Related U.S. Application Data

(63) Continuation of application No. 10/603,100, filed on Jun. 24, 2003, now Pat. No. 7,685,052, which is a continuation-in-part of application No. 09/870,845, filed on May 31, 2001, now Pat. No. 7,428,506, which is a continuation-in-part of application No. 09/750,768, filed on Dec. 29, 2000, now Pat. No. 8,010,438, which is a continuation-in-part of application No. 09/585,049, filed on Jun. 1, 2000, now Pat. No. 7,356,500.

(51) Int. Cl.
*G06Q 40/00* (2012.01)

(52) U.S. Cl.
CPC ...................................... *G06Q 40/00* (2013.01)
USPC .......................................................... 705/37

(58) Field of Classification Search
USPC .......................................................... 705/37
See application file for complete search history.

(56) References Cited

U.S. PATENT DOCUMENTS

| | | | |
|---|---|---|---|
| 3,573,747 | A | 4/1971 | Adams et al. |
| 5,101,353 | A | 3/1992 | Lupien et al. |

(Continued)

FOREIGN PATENT DOCUMENTS

WO    WO 02-097589    12/2002

OTHER PUBLICATIONS

Structural Changes in Trading Stocks, Bartley Madden, The Journal of Portfolio Management, fall 1993, pp. 19-24.*
U.S. Appl. No. 60/133,655.

(Continued)

*Primary Examiner* — Bruce I Ebersman
(74) *Attorney, Agent, or Firm* — Rothwell, Figg, Ernst & Manbeck, P.C.

(57) ABSTRACT

Methods and systems for facilitating trading of securities, preferred methods comprising receiving a first buy or sell order from a first user; calculating a block price range; determining that said first order is reasonably priced; transmitting to a second user a notification that a reasonably priced order is present, but without notifying said second user of the side; receiving a second order from said second user, wherein said second order is a contra to said first order and nearly matches but does not cross said first order; transmitting a contra order notification to said second user after said second order is received, said contra order notification indicating that a nearly matching contra order is active; receiving a third order from said second user, said third order being a contra to said first order and crossing said first order; and executing a trade comprising said first order and said third order.

12 Claims, 11 Drawing Sheets

(56) References Cited

U.S. PATENT DOCUMENTS

| | | | |
|---|---|---|---|
| 5,136,501 A | 8/1992 | Silverman et al. | |
| 5,469,498 A | 11/1995 | Abe et al. | |
| 5,689,652 A | 11/1997 | Lupien et al. | |
| 5,717,989 A | 2/1998 | Tozzoli et al. | |
| 5,724,524 A | 3/1998 | Hunt et al. | |
| 5,794,207 A | 8/1998 | Walker et al. | |
| 5,842,178 A | 11/1998 | Giovannoli | |
| 5,845,266 A | 12/1998 | Lupien et al. | |
| 5,873,071 A | 2/1999 | Ferstenberg et al. | |
| 5,920,846 A | 7/1999 | Storch et al. | |
| 5,924,082 A | 7/1999 | Silverman et al. | |
| 5,950,177 A | 9/1999 | Lupien et al. | |
| 5,959,177 A * | 9/1999 | Hein et al. | 800/288 |
| 6,236,979 B1 | 5/2001 | Kawabata et al. | |
| 6,260,025 B1 | 7/2001 | Silverman et al. | |
| 6,285,983 B1 | 9/2001 | Jenkins | |
| 6,304,858 B1 | 10/2001 | Mosler et al. | |
| 6,317,728 B1 | 11/2001 | Kane | |
| 6,321,212 B1 | 11/2001 | Lange | |
| 6,408,282 B1 | 6/2002 | Buist | |
| 6,421,653 B1 | 7/2002 | May | |
| 6,578,014 B1 | 6/2003 | Murcko, Jr. | |
| 6,985,883 B1 | 1/2006 | Togher et al. | |
| 7,003,486 B1 | 2/2006 | Condarmoor et al. | |
| 7,035,819 B1 | 4/2006 | Gianalouros et al. | |
| 7,130,823 B1 | 10/2006 | Rayner et al. | |
| 7,136,834 B1 | 11/2006 | Merrin et al. | |
| 7,162,447 B1 | 1/2007 | Cushing | |
| 7,246,093 B1 * | 7/2007 | Katz | 705/37 |
| 7,249,027 B1 | 7/2007 | Ausubel | |
| 7,376,614 B1 * | 5/2008 | Scheinberg et al. | 705/37 |
| 7,395,238 B2 * | 7/2008 | Alaia et al. | 705/37 |
| 7,617,144 B2 * | 11/2009 | Madoff et al. | 705/37 |
| 7,689,495 B1 * | 3/2010 | Kim et al. | 705/37 |
| 7,689,497 B2 * | 3/2010 | May | 705/37 |
| 7,774,246 B1 * | 8/2010 | Keith | 705/35 |
| 2001/0039527 A1 | 11/2001 | Odish et al. | |
| 2002/0007335 A1 | 1/2002 | Millard et al. | |
| 2002/0035534 A1 | 3/2002 | Buist et al. | |
| 2002/0052827 A1 | 5/2002 | Waelbroeck et al. | |
| 2002/0055901 A1 * | 5/2002 | Gianakouros et al. | 705/37 |
| 2002/0077941 A1 | 6/2002 | Halligan et al. | |
| 2002/0082967 A1 | 6/2002 | Kaminsky et al. | |
| 2002/0091617 A1 | 7/2002 | Keith | |
| 2002/0133449 A1 | 9/2002 | Segal et al. | |
| 2003/0004859 A1 | 1/2003 | Shaw et al. | |
| 2003/0009411 A1 | 1/2003 | Ram et al. | |
| 2003/0083973 A1 | 5/2003 | Horsfall | |
| 2003/0093343 A1 | 5/2003 | Huttenlocher et al. | |
| 2005/0289043 A1 | 12/2005 | Maudlin | |

OTHER PUBLICATIONS

U.S. Appl. No. 60/202,379, filed May 4, 2000, Buist.

Domowitz, A Taxanomy of Automated Trade Execution System, Journal of Int'l Money and Finance of Butterworth Scientific, V12, 1993, pp. 607-632.

Madden, Structural Changes in Trading Stocks, The Journal of Portfolio Management, Fall 1993 pp. 19-27.

Hendershott, Electronic Trading in Financial Markets, it Professional, IEEE Service Center, Los Alamitos, CA, vol. 4, No. 4, Jul. 2003, pp. 10-14.

Lux et al, May Day II, Part 1 of 2, Institutional Investor Americas (Reform and Technology are transforming the over the counter stock market and trading world will still continue to change).

Trade Point Files with SEC to allow HW Securities Week, vol. 24, No. 44, p. 1.

Untitled Article International Gas Report, Jan. 1994.

ISA/210 PCT/US04/19706.

ISA/210 PCT/US07/08745.

EP/SR 05729202.

\* cited by examiner

FIG. 8

CONFIDENTIAL BLOCK TRADING SYSTEM AND METHOD

CROSS-REFERENCE TO RELATED APPLICATIONS

This application is a continuation of U.S. patent application Ser. No. 10/603,100, filed Jun. 24, 2003, which is a continuation-in-part of U.S. patent application Ser. No. 09/870,845, filed May 31, 2001, which is a continuation-in-part of U.S. patent application Ser. No. 09/750,768, filed Dec. 29, 2000, which is a continuation-in-part of U.S. patent application Ser. No. 09/585,049, filed Jun. 1, 2000. The entire contents of each of the above-listed applications are incorporated herein by reference.

FIELD OF THE INVENTION

The subject invention relates to a method for managing information to focus block-trading interests into a confidential crossing book, and executing block trades over a computer network such as the Internet.

BACKGROUND

In public securities markets, market mechanics and trading psychology create barriers to efficient information dissemination and price discovery. A market participant's decision to reveal information regarding a large trading interest typically represents a tradeoff between confidentiality and liquidity. As used herein, the term "market participant" refers to any person or firm with the ability to trade securities; examples of market participants include broker-dealers, institutions, hedge funds, statistical arbitrage and other proprietary trading operations, and private investors trading on electronic communication networks (ECNs).

By publicly revealing the details of a significant active buying interest, for example, a market participant assumes the risk of adverse price action—other traders may view his buying interest as an indication that the stock is worth more than its current price. Other market participants that had legitimate selling interests, and market makers that seek short term trading profits, will "fade" their offers (become less aggressive sellers), resulting in an increase in the market price. There is also an empirically demonstrable risk of adverse price action due to "front running" (buying activity by other market participants in anticipation of price movement resulting from the large revealed order).

Confidentiality can be maintained to some degree by slicing the large order up into many small pieces to avoid arousing interest, but this process either fails to fill the order quickly when the trader is most careful to hide its existence, or if when it is worked at a faster rate, information about the existence of the order leaks out leading to much the same effect as the above mentioned order display problem.

In either case, an economically efficient transaction is missed because the trading costs associated with disseminating information are too high.

Trading large blocks on the New York Stock Exchange floor is also hindered by rules designed to protect the interests of floor brokers representing short term trading interests, and the proprietary trading interests of the specialists themselves. Floor brokers can participate with an Institutional order, taking an equal portion of the liquidity coming in on the contra side, to take a short term speculative position with the safety net provided by the larger Institutional order; or "penny jump" on the Institutional order by intercepting the contra-side liquidity with a one-cent better price, rather than allow it to fill the Institutional order. Specialists utilize various methods including penny jumping to extract profits from information about Institutional activity; invariably these activities lead to adverse price movements and lower fill rates for the Institutional orders.

Another known difficulty with trading large blocks is one that is sometimes called the "buyer's remorse" problem. When a trader places a large block and gets it filled quickly, the trader's natural reaction is to believe that the easy fill indicates that it was a poor trading decision—either there was a much larger contra whose residue will subsequently drive the price adversely, or the block's price was too attractive, leading to its quick acceptance. This "buyer's remorse" effect leaves the client unsatisfied and unlikely to place similar orders through this same channel in the future, since the quick fill would be perceived as a failure of this channel to provide protection from a poor trade.

One known approach to matching trading interests and executing block trades while limiting information dissemination is employed by the POSIT® matching system. The POSIT® system allows trading interests to accumulate and initiates a matching sequence at set intervals. Market participants place confidential orders in the system and are unaware of the amount or aggressiveness of other orders on the same side or on the contra side until the matching is released. This approach does not provide for any mechanism to notify traders that may have nearly matching prices but overlapping order quantities that they could achieve a trade with only a small change in their price. Also, by being a black box it fails to provide information that would indicate to traders that there is liquidity in the system in particular securities, so that they would know to pull back orders they may have placed elsewhere in order to participate in the POSIT® match. This approach further fails to enable the broadcast of information based on the activity in the system that may entice traders to enter orders when the system's participants have a higher than usual interest in a given security, this being an indication that the fill rates could then be expected to be higher. It also fails to provide the ability for a participant to initiate transactions at a time of his or her choosing. By pricing all trades at the midpoint, it also fails to provide any mechanism wherein a patient trader with a moderately sized block could draw a better price from a much larger or more anxious block order that would tend to drive the price adversely. Finally, it does not offer any ability for market participants to negotiate or otherwise actively participate in price formation through a process that could lead to the discovery of a fair price for a block trade.

Another system that attempts to manage information to facilitate large block trades is the LiquidNet Trading System. Users of this system contribute data regarding their trading interests directly from their Order Management Systems. When a user indicates an interest that matches contra interests already expressed within the system, all matched users receive an invitation to enter a negotiation session. If this invitation is accepted, the trader is expected to be firm and negotiate in good faith towards a trade; those that play with the system but fail to negotiate in good faith and close trades are expelled from the system. In the LiquidNet system, traders learn the existence of counter interests before anyone has entered negotiations; while this leakage is useful to entice traders to enter a negotiation process, it also leaks information about orders in the participants' Order Management Systems to parties that may or may not have a firm intention to trade. The system therefore relies on "fair play" by members of the network, which limits participation to a country club of likeminded Institutions. This fails to provide a system where the side of a trading interest can only be revealed to parties that have a firm, electronically executable contra order within the system at a reasonable price, and through this rule permits the participation of parties that have different incentives and trading horizons, including sell-side firms and hedge funds. The LiquidNet information management model, by leaking information regarding the side of a participant's order without a firm liability to trade, fails to achieve a proper balance between the need for confidentiality and the need to share some information in order to focus block interest in time, as can be achieved through means that indicate to traders that there is trading interest within the system without revealing the side of said interest until a trader has been exposed to a firm liability to trade. It also fails to provide the protection from gaming that can be achieved by a block crossing system wherein the only means to discover the side of a second participant's order is to place an aggressively priced large block order, which would then have a significant probability of being executed. By allowing orders of all sizes, the LiquidNet system also fails to provide a solution to the buyer's remorse problem, wherein a buyer that has a large order completely filled with great ease later fears that the contra had a much larger sell order whose residue is likely to drive the price down.

Harborside Plus offers another system to facilitate the crossing of blocks based on the management of trading interest information. In the Harborside system, traders are asked to send indications of interest into their database when they have an interest in buying or selling at least 25,000 shares of stock at the current midpoint price. These indications of interest are stored electronically and expire after a certain number of minutes, which depends on the client's trading style (for example, hedge funds or brokers tend to trade quickly so their indications will expire after only a few minutes). When there is an IOI on both sides in the security, a sales trader is notified through a popup window and will proceed to call the customers to close a trade. The mediation of a human trader is intended to ensure that the system is not abused by traders that would enter an IOI when in fact they do not have an interest to trade, since the damage to the relationship would make it less likely that this trader would get called again in the future. This system does not anticipate a trading system wherein fair play is enforced automatically by requiring traders to enter firm, electronically executable orders, that could either execute on arrival or be exposed to an execution from another party resident within such a system before the owner of said order receives any information back about other traders' interests. It also fails to provide any means for automating the negotiation process that is carried out by the sales trader. Since a sales trader is involved, it fails to provide the anonymity that traders expect from a computer system, where traders are enabled to negotiate directly with each other without leaking information to a third human being who may or may not be fully trusted. Finally, the Harborside system fails to anticipate mechanisms to entice other traders to express their trading interest in a security when there is evidence of trading interest on one side only. Finally, it fails to anticipate the possibility of showing information about one-sided trading interests without revealing the side, for the purpose of focusing interest in the security at this time without leaking price-impacting information to parties that have not expressed a firm liability to trade.

A fourth example of a system that attempts to manage information to facilitate block trades is the Liquidity Tracker facility, deployed by the Nasdaq Stock Market and subject of co-pending U.S. patent application Ser. No. 09/870,845, the entire contents of which are incorporated herein by reference. Liquidity Tracker enables a user to enter a firm order to trade and show information about this order to likely counter-parties. In the Liquidity Tracker system, the counter-parties are identified using real-time access to clearing information that Nasdaq participants submit through the Automated Confirmation and Transaction (ACT) system. By selectively targeting likely contra parties only, the intention is to avoid leaking information to other traders that could front run on the Institutional order or otherwise misuse this information for short term trading profit. However, since the Liquidity Tracker system only selects contra parties, the recipients will know if the first participant was a buyer or seller, i.e. the side of the order entry participant is not kept confidential. Some recipients of this information may be induced to stop or even reverse their trading direction instead of accepting the order, in the hope of seeing a better price later. While the level of confidentiality provided by the selection of targets is appropriate for somewhat larger orders than those that could be displayed on a public book, there are instances where traders with larger institutional blocks will feel uncomfortable with this level of confidentiality.

In this environment, there is an acute need for a confidential crossing system that enables users to place an order that will not be shown to anyone, but will nevertheless cause an information event that can help bring traders together at the same time in the same security.

In order to be productive rather than destructive, information events in a trade negotiation process should avoid two problems:

1. The preference revelation problem. Once a trader has displayed an interest to buy (sell) a fungible item, other participants that see this interest will increase (decrease) the value that they were placing on this item. In equity trading, showing a large buy (sell) order leads others to revise and perhaps cancel their intent to take a contra position. On the other hand, by not expressing a preference one misses the opportunity to trade altogether.
2. The buyer's remorse problem. When purchasing a fungible item, when the deal is closed with greater ease than expected, the buyer tends to assume that it was likely too good a deal for the other party. In the context of equity trading, when a large block order gets completely filled the trader would assume that the contra party's order was even larger and its residue would subsequently affect the price adversely as it gets worked in the marketplace. This problem is particularly acute for a system that caters to large Institutions.

SUMMARY

The systems and methods of the present invention provide novel solutions to the above-mentioned problems of institutional block crossing.

A preferred embodiment of the system limits the revelation of trading preferences by not showing the side on which one intends to trade until the final steps of a negotiation. Upon entry of a reasonably priced order, the system sets the symbol in an "active" state. This indicates to other participants that an order has been entered in this security, but without revealing whether it was a buy or a sell order.

In the preferred embodiment the system determines prices to be "reasonable" if they are at least as aggressive as the passive end of a Block Price Range (BPR). The BPR is calculated based on the current market prices, recent volatility in the symbol, and liquidity, and shown to the trader on a Graphic User Interface (GUI). In the preferred embodiment the BPR is calculated by predicting the price range that one is likely to see in the next 60 seconds, and this range is recalculated at 60-second intervals. In an alternate embodiment a "reasonable" price is deemed to be one that is within a given number of cents (or fractions thereof) from the National Best Bid or Offer, for buy or sell orders respectively, on the time of order entry.

A second participant who sees the symbol active flag and has an interest in trading the same security can elect to enter an order. If it is on the contra side and is sufficiently aggressive in price to cross the first participant's order, the trade is executed at the first participant's limit.

The buyer's remorse problem is addressed by requiring all traders to enter orders only in multiples of a large block quantity. This quantity is chosen to be somewhat larger than the typical size of orders usually sent to broker-dealers. For the most liquid securities, for example, the system can be configured to use a large block quantity of 100,000 shares. As a result, it will be the traders' expectation that most orders in the system are for one unit of this large block quantity only. As a result, when a trader receives a complete fill on a 100,000 share order this does not indicate in any way that the contra's order in the system should be expected to be larger—most likely it is also a 100,000 share order and the complete fill is only a reflection of the system's mandated large block size. In an alternate embodiment, orders can only be entered for this large block quantity and there is never a residue after a fill. In yet another alternate embodiment, the traders further commit to not trade on the market for 30 minutes after a trade is done, and agree to enable random audits to verify that the voluntary restriction is respected, or when verification is deemed to be necessary.

Having reduced the likelihood of buyer's remorse, it is then possible to allow traders to know by means of a "contra present" flag when there is a nearly matching contra order within the system. Since the sizes of the two orders are likely the same, the information about the presence of matching orders on both sides does not point to any adverse price movement in the near future: if both traders canceled out of the match they would each be trading on the regular market and their respective trades would balance each other out with no net price impact. Therefore, the information that there are contras present is consistent with an assumption that the current market price is a fair price to close a deal on a large block. To avoid the possibility that some traders may enter an order on an active symbol only to see the contras present flag and then immediately cancel, the system described in the preferred embodiment lets resident orders see the contras present flag immediately as soon as a contra order is entered, but delays showing the flag to the second participant that entered the contra order and shows this flag only after 30 seconds if the contras present situation persists. This gives the resident order a 30-second time window to either execute the newly entered order by increasing the price aggression, or cancel his or her order before its existence is revealed to the second participant. The first mover advantage to the resident order provides an incentive to enter orders that will set the symbol status to "active", thereby enhancing the liquidity in the system, which in turn will draw other traders that have an interest in taking said liquidity.

In a preferred embodiment, traders may enter orders at any price but the active symbol and contra present flags are only issued based upon orders that are priced within a system-announced "Block Price Range." The Block Price Range is determined based upon the National Market Best Bid and Offer and the stock's recent volatility, with the intention to provide guidance on a range of prices within which one would be most likely to execute a large block trade. For example, the Block Price Range can simply be taken to be the range from the National Best Bid minus 5 cents to the National Best Offer plus 5 cents. If all traders know the current BPR, they know that entering an order within this range will cause the active symbol flag to be displayed to participants. A second participant who sees the active symbol flag and would like to buy a large block of stock can then enter a buy order at the Block Offer (top of the BPR); if the first order that caused the active symbol flag to be posted is still open and was a sell order, the second participant would then have the certainty of a fill. Conversely, if such an aggressive buy order did not fill, the second participant would know that either the first order had been canceled or it was also a buy order. If the second participant instead entered a passive order—for example, an order to buy at the Block Bid—then that order would most likely not get filled on arrival even in the case where the first participant was a seller. Instead, the first participant would see a "contras present" message and may elect to lower his or her price to lock in the trade. If the first participant takes no such action, after 30 seconds the second participant would learn that the first participant's order that caused the active symbol flag was in fact a passive seller, and may elect to increase his or her price to meet at a reasonable price in-between. As long as both participants are seeing the contras present flag, they can modify their prices until a trade gets done; the more anxious trader will be more likely to raise the price aggression level more quickly, leading to a natural price discovery process even in the absence of any displayed prices other than the BPR guideline.

In the preferred embodiment, the traders in a contras-present situation do not receive information about the price movements of their counterparties; they are simply expected to price their orders at what they consider a fair price and hope that the other party will do the same. In an alternate embodiment, the traders see that the contra party has increased or reduced their price aggression and may use this information to determine that it is worth similarly raising their own price aggression level. If each trader does this in turn by a minimum 1-cent (or other pre-set) interval the two will meet approximately half way between the original buy and sell prices.

A schematic view of a preferred computer system embodiment of the present invention is given in FIG. 1.

The system preferably comprises a trade facilitation system 100 (also referred to herein as Cloud9). Said trade facilitation system 100 is connected to participants through a communication network 80 such as the Internet, and a financial information exchange network such as a FIX Network 90. System 100 receives market data from a vendor 60 through the vendor's network 70. Participants access the system through a graphic user interface (GUI) 20 installed at each participant's workstation. Orders are routed to an Execution Engine 50. Matching orders are traded automatically when received by said Execution Engine. Cloud9 comprises a Net Server subsystem 110 responsible for connectivity to each client GUI; a Financial Information Exchange (FIX) Server 120 to provide connectivity to back-office systems and client order management systems; and an Order Manager subsystem 130 responsible for implementing the order handling logic of the system as described herein. Facilitator module 140 creates information events intended to focus interest and steer users toward a trade. The trade facilitation system 100 keeps track of the status of its orders in a transactional database 150. The price aggression of orders is evaluated with respect to a Block Price Range, which is computed by an Analytics Server 160: the price of an order can be (a) more passive than the BPR, or (b) aggressive, meaning that the price is either within the BPR or more aggressive than the BPR. The Execution Engine 50 receives orders through the Communications Network 80 and electronically stores them in a transactional, fault tolerant database (the Book 51); it reports executions back to the trade facilitation system 100 over this same network. In an alternate embodiment, the Execution Engine 50 can be hosted locally as an additional component within the Cloud9 system 100.

Participants use a graphic user interface 20 to enter orders into the system. When said order is executed, the results are reported for processing to their sponsoring broker 95 and to their own firm's Order Management Systems (OMS) 10 using the FIX protocol.

All orders are preferably required to be "Large Block Orders" which means their size must be a multiple of a large block quantity. For example, if the Large Block Quantity were 100,000 the GUI only allows orders that are a multiple of 100,000 shares. The orders can be Limit or better, or pegged to a market indicator such as the midpoint between the best bid and offer on the National Market. All validated block orders are immediately routed to the Execution Engine 50, where they are stored in the Book 51. In an alternate embodiment, orders of any size are accepted.

Both Cloud9 and the Execution Engine 50 preferably process orders on a first come first served basis.

The GUI 20 enables a trader who has an interest in trading a large block in a given security to click on the security's symbol as displayed in a box on top of the main screen, to bring up an order entry dialog and automatically populate the fields of the order entry dialog in accordance with his or her pre-configured preferences. The trader will edit these fields as needed and press a button marked "Submit" to place the order.

If a newly entered order matches a prior book order (the new order is in the same security, on the opposite side, and with a price that equals or betters a standing book order), the Execution Engine 50 automatically executes a trade at the price of the standing order, and electronically reports the trade to the Automated Confirmation and Transaction (ACT) 40 service for the consolidated tape, and to the sponsoring broker's clearing firm 30. Notice of the execution is also sent to the graphic user interface 20 to notify the trader of the trade. If on the other hand there is no matching order in the book, the new order remains stored in the book as a standing order. In a preferred embodiment clients can elect to have their orders sponsored by a third party broker, in which case the trades are also reported to the sponsoring broker's back-office systems 95 via FIX.

In order to increase the likelihood of trades, the system's Order Manager 130 is connected to a facilitator module 140, which automatically takes action when a newly-entered order does not find a match but is stored in the book 51 as a standing order. In a preferred embodiment, only orders that are reasonably priced are subject to facilitation; a reasonable price range for trading large blocks (the Block Price Range) is computed by the Analytics Server 160 and posted on the graphic user interfaces 20 of traders with an update every 60 seconds. The purpose of the facilitator 140 is to generate information events that will encourage others to enter orders in the same security, without leaking the price or side of the order.

In a preferred embodiment, there are two possible action flows when the facilitator 140 is called into action, depending on the state of the orders as known within the system's database 150.

In the first case, when a newly entered order does not find a match, the state of the system is such that there are no reasonably priced contra orders within the system. A message is delivered to all parties that subscribe to this security, indicating that the symbol subject of the newly entered order is now "active" within the system (if it was already active, this step is omitted). The graphic user interface 20 will display active symbols in an orange-colored box 215 above the order entry dialog 205, as illustrated in FIG. 2. The system preferably enables a second participant who sees an active symbol and has an interest in trading a large block in this security to bring up an order entry dialog by clicking on the symbol. The system preferably populates all the fields of the order entry dialog 205 in accordance with the second participant's pre-configured preferences. The second participant is acting with the knowledge that the symbol is "active." Therefore, he will understand that a first order was previously entered that caused the symbol to become active, and this first order was priced within the BPR. Taking advantage of this information, the second participant might elect to submit a limit buy (sell) order at the block offer (block bid), to essentially guarantee a trade if the first order was on the contra side and is still open. In a preferred embodiment, once a symbol has become active it will stay active for at least 60 seconds; the symbol activity state is reviewed in conjunction with BPR updates and set to inactive only if it has been active for more than 60 seconds and there are no more reasonably-priced orders currently open within the system at the time scheduled for a BPR update. In an alternate embodiment the symbol's activity status is updated in real time to reflect whether or not there is a reasonably priced order within the system at this time. In another alternate embodiment, in addition to the color the GUI displays the number of reasonably priced orders that are currently open within the system.

In the second case, the state of the system is such that there is already a reasonably priced order on the contra side, but it's not quite aggressive enough to meet the limit price offered by the newly entered order. In this case, the facilitator module 140 will immediately send a message to all participants with reasonably priced standing contra orders to let them know that there is now a reasonably priced contra order present within the system. The graphic user interface 20 displays the "Contras Present" message by highlighting the symbol in a yellow-colored box 225 above the order entry dialog 205, as shown in FIG. 2. The first participant, who caused the symbol to be active, will therefore see that there is now a contra present. The system preferably enables said first participant to re-price the order at an aggressive price and replace the order so as to execute the second participant's order. In a preferred embodiment the system automatically proposes the aggressive end of the BPR as the default price to encourage a strategy that will result in a trade; the trader can then modify the order parameters as desired. In an alternate embodiment the system enables users to configure an aggressive order type to be limited to the better of the BPR or a configurable number of cents (or fractions thereof) from the current National Market Midpoint price, and this aggressive order type is then the one that is proposed as the default in a contras present situation. In a preferred embodiment the user is allowed to enter an order that will cause the system to attempt to execute the contra's order by means of clicking on the yellow box with the symbol and then pressing a single button labeled for this purpose. In an alternate embodiment the user interface 20 lets the trader select a new price and press a button marked "Replace." If none of the traders with standing orders raise their price aggression, and there are still standing contra orders after 30 seconds, the second participant that originated the contra order will preferably also learn that there are standing contra orders within the system. The system preferably displays this information by means of a yellow box, as described previously for the first participant; and said second participant may elect to increase his or her price aggression to close a trade. The 30-second delay is intended to discourage traders from probing the system to discover whether contras are present, and then attempting to cancel immediately thereafter. This safety mechanism is effective to the extent that the BPR is not too far removed from the current market, so that during the 30-second interval the newly entered order faces a real chance of being executed by one of the traders with a standing order. In an alternate embodiment there is no 30-second delay and all traders are simultaneously informed of the contras present situation, but there is a 5-second minimum time in force during which orders may not be canceled. In another alternate embodiment all users receive the contras present message immediately and there is no minimum time in force condition. In an alternate embodiment traders may configure the GUI 20 to automatically replace their order with an aggressive price when a contras present situation arises. In this last embodiment if there are multiple orders within the system with automatic re-pricing instructions and competing to execute the same contra order, the system executes orders in price-time priority: standing orders compete on price first to fill the incoming contra order, then if two orders have the same aggressive price limit, on time of entry, with priority going to the first order entered.

A preferred algorithm to calculate the Block Price Range (BPR) seeks to determine reasonable prices for trading a large block order within the next 60 seconds, depending on the volatility of the stock. In the preferred embodiment, this range is based upon the prices at which trades have been reported to the consolidated tape since the last time the BPR was updated, taking a symmetric price range up and down from the current midpoint of the National best bid and offer. This range extends up and down from the midpoint by an amount that is directly related to the observed price volatility since the most recent BPR update.

Acronyms

| Acronym | In extenso | Description |
| --- | --- | --- |
| ACT | Automated Confirmation and Transaction service | Nasdaq facility allowing the real time comparison of trades and forwarding of clearing information to the Depository Trust and Clearing Corporation (DTCC). |
| API | Application Programming Interface | Enables third party developers to create a front-end software application that will connect to the system and allow it to be accessed by remote users. |
| BlockLink | | System subject of a related application which enables users to facilitate block trades by sending invitations to trade to likely contra parties. |
| BPR | Block Price Range | A price range that is deemed to be reasonable for the purpose of affecting a large block trade. |
| Enum | Enumeration | Term used to denote a data type in an electronic information storage facility, wherein the possible values taken are among an enumerated list. |
| FCM | Fidelity Capital Markets | Example of a possible sponsoring broker for the system subject of the present invention. |
| FIX | Financial Information Exchange protocol | Standard protocol used in the financial markets for communicating order and trade information. |
| GUI | Graphic User interface | Front end application intended to enable access to the system subject of the present invention. |
| INT | Integer | Usually refers to a data type in an electronic information storage facility |
| IOC | Immediate Or Cancel | Attribute of an order indicating that the order should be canceled if it cannot be filled immediately. |
| IOI | Indication Of Interest | Message used in the financial markets to indicate interest in purchasing or selling a security. |
| LBQ | Large Block Quantity | A standardized order size per symbol used in the system subject of the present invention to increase the chance that orders will match. |
| LQT | Liquidity Tracker | Nasdaq facility subject of a related application referenced herein. |
| MID | Midpoint | Price that is at an equal distance from the Best Bid and the Best Offer on the National Market. |
| MPID | Market Participant ID | 4-letter acronym used to identify a broker dealer on the Nasdaq stock market. |
| NotHeld | | Attribute of an order giving the broker discretion to handle this order without the constraints of order display and handling rules pertaining to held orders. |
| OATS | Order Audit Trail System | System operated by the National Association for Securities Dealers for the purpose of market regulation. |
| OMS | Order Management System | Computer system allowing firms to keep track of the status of orders, portion that is filled or being worked, etc. |
| Peg | | Order attribute indicating that the limit price is to be calculated at the moment of a match opportunity in reference to the National Market. |
| PegOffset | | Order attribute giving the number of cents to be added to the pegged price. |
| Q/A | Quality Assurance | Part of the software development process. |
| Ticket | | Message sent from an Order Management System to a broker or trading system, to indicate an intent to trade a certain number of shares through this broker or trading system. |
| TIF | Time In Force | Attribute of an order indicating the time duration of the order's validity. |

BRIEF DESCRIPTION OF THE DRAWINGS

FIG. 8 depicts a preferred watch list configuration dialog.

DETAILED DESCRIPTION OF PREFERRED EMBODIMENTS

The following is a functional description of preferred and alternate embodiments of the subject invention.

Key features. Below is a preferred list of features of the subject invention:

1. Confidential crossing of blocks. Orders are routed to a matching engine that will cross orders with price time priority and report locked-in trades for clearing. The matching engine can be remotely hosted.
2. Large Block Quantity. All orders must be entered in a multiple of a large block quantity configured per security. The large block size deters gaming and mitigates the "buyer's remorse" problem, or fear of being on the wrong side following a complete fill, by encouraging users to use the same order quantity.
3. Active Symbol Flag. The system will push active symbol alerts when it determines that there is block interest on both sides of a security. This will focus order entry in a narrow time window and thereby increase the fill probability.
4. Contras Present Flag. Traders with a reasonably priced order in the system will be alerted when a nearly matching contra order is entered. 30 seconds later, the participant with the new order is also alerted of the presence of a near match. The contras present flag focuses orders in price to maximize the probability of a trade.
5. FIX Connectivity to Back-office. Cloud9 supports mechanisms to deliver FIX executions to a Buyside Order Management System either directly or through a FIX Service bureau. Supports end of day anonymity for the buy-side client with respect to the sponsoring broker.

6. FIX Ticketing application. Clients can place shares from their Order Management System to Cloud9 (symbol, quantity and side), then work up to the placed quantity using the GUI 20. The OMS can be updated to keep track of individual working orders, or only upon a fill, depending on the client's configuration.
7. API/GUI Access. Cloud9 may provide a house-branded trading front-end designed with input from institutional traders, that prominently displays the active symbols for a watch list of securities of interest, and prompts the trader to close a trade when the contras present flag is set.

The API may also be published to enable approved third parties to build access from their own front ends.

Figure 3A:
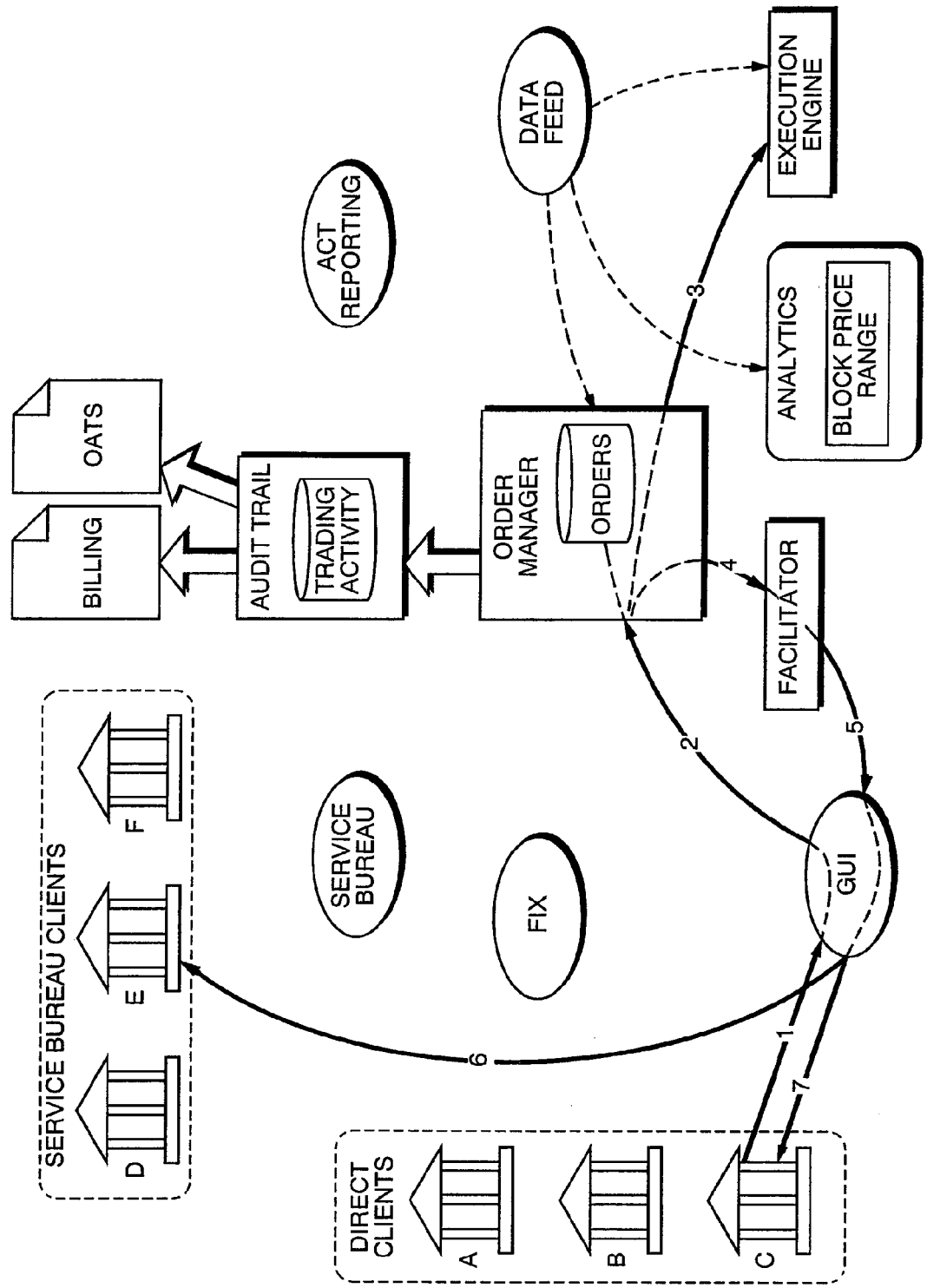
FIGS. 3(a) & 3(b) depicts operation of a preferred system and method, including interaction of the system with electronic systems of participants and related firms.
Figure 3B:
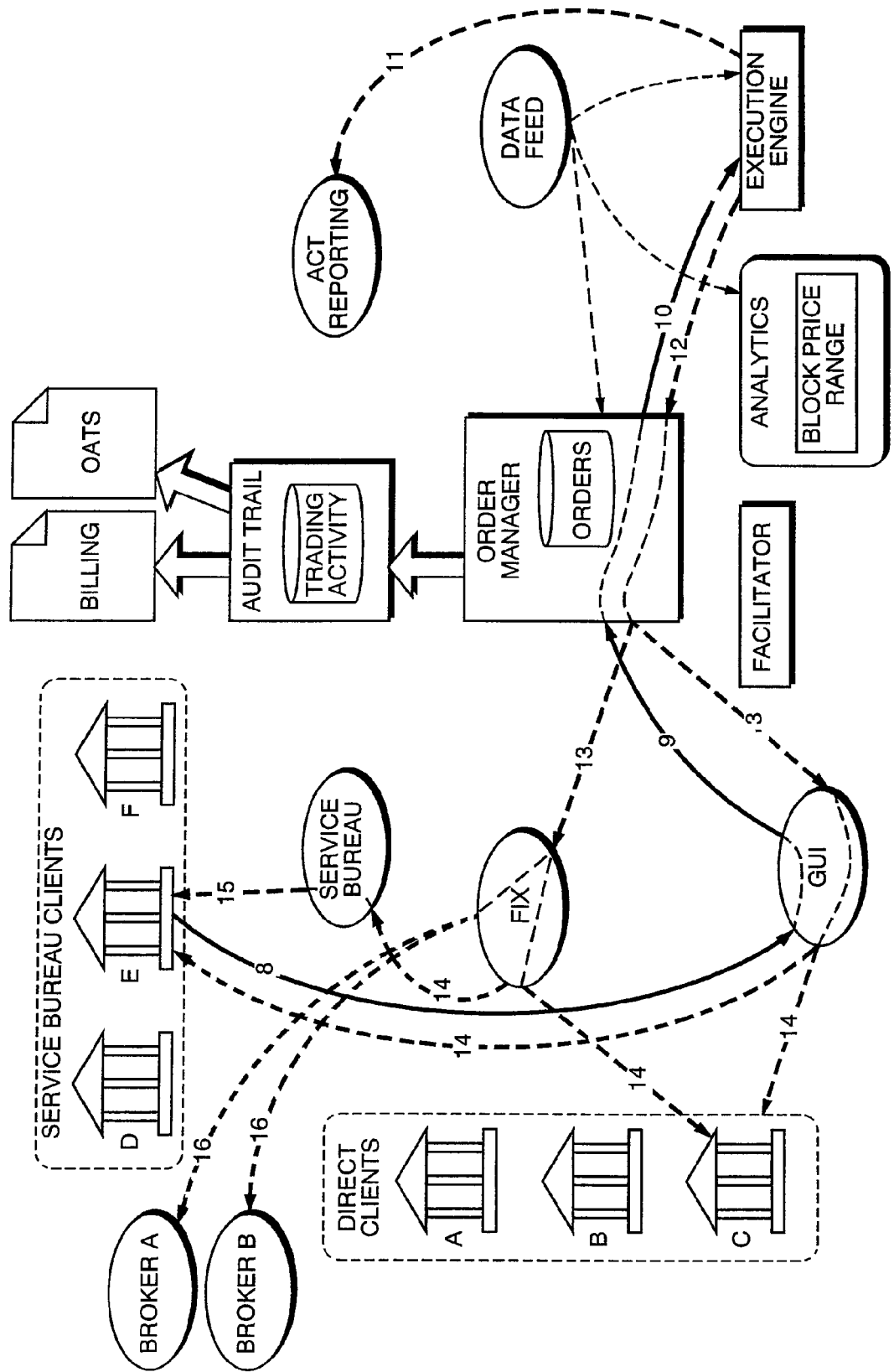

The invention comprises a preferred architecture for integrating the system with the electronic systems of participants and related firms such as the sponsoring brokers or their clearing firms. An overview of this integration is represented in FIGS. 3(a) & 3(b). These figures illustrate the flow leading to a trade between participants C and E, described below. With standing orders already in the system, a new participant enters a contra order. The system sends out the contra present flag; participant modifies the standing order to a higher price aggression level, resulting in an executed trade.

The system preferably facilitates the trade in the above example through the following steps:

1. In step 1 a user enters an order into the system, preferably using a Graphic User Interface 20.
2. The system preferably assigns a broker of record in step 2 and validates the order against any credit limits based on the broker of record and customer ID. The order information is stored in a database 150.
3. In step 3 the Order Manager 130 routes the order to the execution engine 50, and expects an order update message back from the execution engine indicating whether the order was filled on entry, stored as a valid limit order, or canceled if the order was invalid.
4. Upon finding that the order did not execute or cancel in the execution engine, the OM 130 notifies the Facilitator Module 140 of the order entry event.
5. The Facilitator Module 140 finds that there was a contra present in the system; it sends the resident contra the "contra present" message immediately and schedules an event to release this same message to the trader that just entered the new order after a 30-second delay.
6. In step 6 the contra present message is delivered to the resident order. This is preferably done immediately. In an alternate embodiment the contras present flag is sent after a 10-second delay, to give the second participant time to try a more aggressive price before leaking information about the order.
7. Step 7 preferably occurs 30 seconds after the first contras present message was sent: the contra present message will be delivered to the new order, if the contra present situation persists.
8. In step 8, the resident order, a sponsored customer using a service bureau for their FIX connectivity to the system, receives the contra present flag on their GUI 200 and modifies the order to increase price aggression.
9. In step 9, the OM 130 routes the modify order request and updates the state of the order in the OM database 150.
10. In step 10 the OM 130 passes the modify order message to the execution engine 50.
11. In step 11 the execution engine 50 determines that the new price aggression is sufficient to lock in a trade and preferably reports this trade to ACT with the clearing counter-party information. In an alternate embodiment the trade is reported for tape only and the clearing information is withheld until end of day to delay the time when sponsoring brokers are notified of the trade.
12. The execution engine 50 preferably reports the execution to the Order Manager 130; OM 130 updates the state of the order in its database 150 and updates the credit consumed.
13. In step 13 the Order Manager 130 reports the trade to Net Server 110 and to FIX server 120.
14. Net Server 110 and FIX Server 120 forward the execution message to their respective clients.

15. The second client receives the FIX executions through the service bureau.
16. In the last step of the trading process a drop copy of the execution is sent to the sponsoring broker(s). In the preferred embodiment this is done at the end of day; in an alternate embodiment it is done immediately and the sponsoring brokers are directly informed of all trading activity they sponsor.

Facilities

The system preferably comprises the following facilities or subsystems:
1. NetServer 110. The NetServer subsystem enables clients to access the system through a Graphic User Interface 200. This is preferably the only interface that can be used to enter orders into the system. All users must either download the trading application (GUI), or develop a GUI that provides satisfactory visibility to the active symbol and contra present flags. Net Server 110 preferably supports connectivity to the trader front end via a published API.
2. FIX Server 120. The FIX Server is a computer system that allows clients to connect for the purpose of exchanging financial information messages according to the FIX protocol; source code for a FIX server is available in open source code libraries. The Cloud9 FIX Server preferably is configured to receive Tickets (New, Cancel, Cancel/Replace) and order status request messages. It will push out Executions including order updates and fills. It preferably supports direct connections with client Order Management Systems, as well as connections through a service bureau. The FIX Server may also be used to deliver execution messages (with "done" status) to a sponsoring broker to set up after trade processing. Normally these messages will be issued at the end of the day, but clients preferably can also request the system to notify their broker of executions intra-day if needed.
3. Order Manager 130. The Cloud9 Order Manager processes orders and subsequent trading messages, passing them to the execution engine for storage and execution. It preferably receives BPR update messages from the Analytics Server 160 and maintains the price aggression flag on its orders, by keeping track of when the order is priced at least as good as the BPR, or Passively priced.
4. Facilitator Module 140. The order manager 130 preferably comprises a component in charge of facilitating the entry of matching orders into the system by carefully releasing information about orders, as described herein.
5. Order Management Database 150. The order manager 130 preferably keeps track of the state of the orders in a transactional and fully recoverable Structured Query Language (SQL) database. It also contains reporting modules responsible for reporting the trades to clearing as well as for generating daily mandatory reports to the corresponding Self Regulatory Organization (SRO).
6. Analytics Server 160. The analytics server 160 receives a data feed that informs said server of the market activity state per symbol (start, stop, trading halts), the inside best bid and offer for all Nasdaq and NYSE listed stocks (price, aggregate size and timestamp) and the last sale trade data from the National Market System consolidated tape. The server will preferably store this information into a data cache and carry out analytical calculations to determine the Block Price Range. It is responsible for publishing to subscribing parties, per symbol, inside quote price changes, BPR update messages, and trading halts.
7. Help Desk. The system preferably comprises a Help Desk subsystem, which comprises a user interface such as a web GUI. Help desk operators can access this interface to add/remove/modify client firms, sponsoring brokers, or GUI accounts that are associated with individual traders. The help desk enables trading operations personnel to query the system based on an order ID or by firm and symbol, to trace the sequence of events that follow a client's order entry into the system and give traders that wish to call the help desk a detailed response on the history of their orders through the system
8. Systems Operations Management. The system preferably also comprises a systems operations console subsystem enabling a system operator to manage the functional implementation of all Cloud9 facilities. Besides the common system operations duties, the system preferably also enables operators to carry out other duties including: security; auditing; managing batch processes for end-of-day and begin-of-day events; capacity planning; and managing the entitlements for internal accounts (operator and Help Desk).
9. Matching Engine 50. The Matching Engine 50 can be an Electronic Communications Network, or a third party electronic trading book such as Nasdaq's SuperMontage facility. In an alternate embodiment the system itself comprises a matching engine as a separate component within the Cloud9 system.

Preferred implementations of the above features are described more extensively below.

FIX Server.

Figure 4:
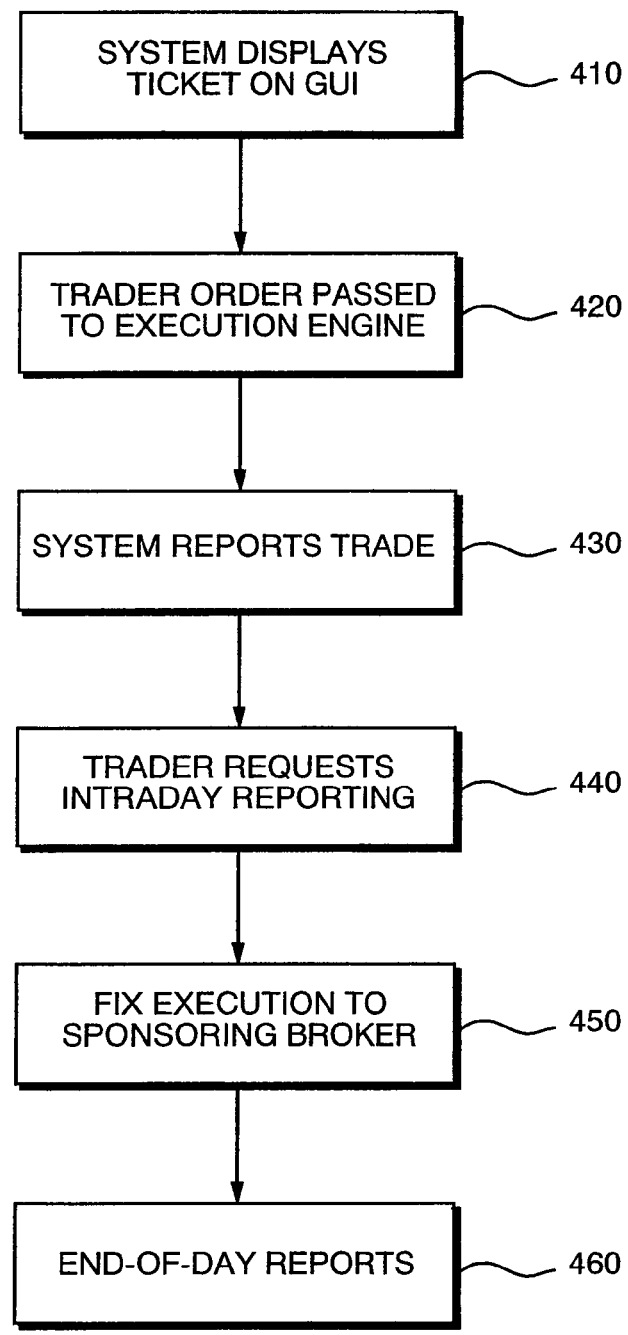
FIG. 4 shows the life cycle of a trade from the clearing perspective, in a preferred embodiment.

Cloud9 preferably uses the FIX protocol for back-office integration with the client Order Management Systems 10 and the sponsoring brokers when needed. FIG. 4 shows the life cycle of a trade from the clearing perspective. The clients are preferably able to choose between two models for using the system. The first model uses tickets to facilitate managing liability across multiple market destinations. Tickets are placements from the client's order management system that helps traders keep a tab on how many shares they are doing in each market destination (a market destination is a place where one can execute orders, such as the present system). The purpose of the ticket is to ensure that the aggregate number of shares placed across all destinations will never exceed the total number of shares of the client's overall order, as known to the client's Order Management System 10. When a trader uses tickets, the tickets that have been entered from the OMS appear on the GUI 20 and orders can only be entered against these tickets.

The client that elects to use tickets preferably will only be able to enter an order into the system if said order is in the same security, on the same side, and of a size not greater than a previously-entered ticket. The system preferably updates back-office and third-party systems by performing the following steps when traders elect to use tickets.
1. In step 410 a ticket is entered into the system 100 as a FIX Order with no price. The ticket carries a terminal ID that the system maps to a particular GUI. The trader sees the ticket show up on his/her GUI.
2. In step 420 a trader enters an order against this ticket, which we will refer to herein as a "child" order. This child order is in the same security and side as the ticket, and for a quantity that is chosen to be the lesser of a trader-configured default order quantity or the ticket quantity. The system preferably validates the order and passes it to the execution engine. In the preferred embodiment the order entry events are reported to the OMS via FIX Execution messages with Order Status=New. In an alternate embodiment the client OMS will only receive Execution messages when the trade is completed (see below).

3. When a trade occurs against this order, the execution engine preferably reports to ACT for tape and clearing (step 430); then notifies Cloud9 of the trade. In the preferred embodiment the Cloud9 system then notifies both the GUI via API and the clients' Order Management Systems via FIX.

4. The system preferably enables the trader to initiate the allocation process before the end of the trading day (step 440 is executed at user's option). To obtain intra-day anonymity, the sponsoring broker is preferably not notified of the trade until the end of day, but the allocation process cannot be completed without notifying the sponsoring broker of the trade. To support end-of-day allocations, the GUI preferably enables the trader to first click a button to request that the system report the trade to the sponsoring broker. This will prime the sponsoring broker's systems for the allocation process. In an alternate embodiment the sponsoring broker is informed immediately of each trade via a FIX Execution message.

5. In step 450 the system preferably sends a FIX Execution message to the executing broker, including the Client-ID.

6. The preferred system carries out the following (step 460) at the end of day.
   a. A FIX Execution message is sent to the executing broker, including the Client-ID. This may duplicate a similar message if it was already sent in step 450.
   b. A trade summary file is sent to the sponsoring broker's clearing firm. This contains the information pertinent to clearing, including the symbol, shares bought or sold, and contra party's MPID.
   c. OATS reports give a summary of the order trail and executions on behalf of the sponsoring broker. The system automatically sends the OATS reports to the sponsoring broker(s) for forwarding to the NASD. In an alternate embodiment it sends the report directly to the NASD. These file transfers are electronic and utilize the File Transfer Protocol (FTP).

In the preferred embodiment users are enabled to select an alternate configuration that does not require the use of tickets, but instead allows traders to start the process at the order entry step 420. The remaining flow is the same as described above.

In an alternate embodiment, the system 100 is hosted by the sponsoring broker for all clients that use the system and comprises after-trade-processing subsystems, as can be easily implemented by those skilled in the art or are commercially available through specialized vendors. In this alternate embodiment there is no need for end of day anonymity and the broker execution reports can be dispatched immediately.

The FIX Server 120 preferably supports a variety of networking solutions to provide connectivity to client Order Management Systems 10. For example the client's OMS can connect directly to said FIX Server; or it can communicate with FIX Server 120 through a FIX Service Bureau that fans out connections between a single FIX Server 120 and a plurality of clients.

The FIX Server 120 will preferably reject tickets when they are invalid or when the client is configured not to use tickets; the ticket reject message preferably carries an intelligible reject reason in the text field. If the rejection is sent because the order quantity was less than the Large Block Quantity for this security, the correct LBQ is preferably given for information in the message text in the reject message. In the preferred embodiment the FIX Server 120 preferably supports the following incoming messages: FIX New Order, Cancel Order, Cancel/Replace, and Order Status Requests. Outbound messages preferably include Order Updates relating to child orders of a given ticket (a FIX Execution message carrying the Order-ID of the underlying ticket), if the client uses tickets. Clients that do not use tickets will preferably receive fills only (FIX Execution messages). In an alternate embodiment clients that do not utilize tickets receive Order Update messages for each event relevant to an order entered via the GUI, including New Order acknowledge messages, so that the OMS can keep track event-by-event of the total size being worked, as well as the size that has been filled.

The FIX Server preferably supports a web configuration screen which enables an operator to set up and customize new client connections without requiring a new software release. As mentioned above, FIX buy-side clients can preferably be configured for either (a) FIX Executions only, or (b) to support ticketing and execution reporting. FIX Sponsoring Broker clients will preferably be configured to receive executions only. In an alternate embodiment it is possible to configure a sponsoring broker's FIX connection to receive a drop copy of every message sent to the sponsored client's OMS. In addition to the execution message sent on each fill, the configuration options preferably include an option to send a final FIX Execution message when an order is complete, with Order Status field set to "done", to indicate that the work on this order is complete.

Order Manager.

The Order Manager 130 operates as a message processor. In the following paragraphs the processing of various messages is described.

The system preferably enables users to enter New Ticket messages. A New Ticket message is a FIX New Order message with Order Type=Market and no limit price. FIX Orders with a limit price will be rejected. In an alternate embodiment this message may be submitted over an Application Programming Interface (API).

Figure 5:
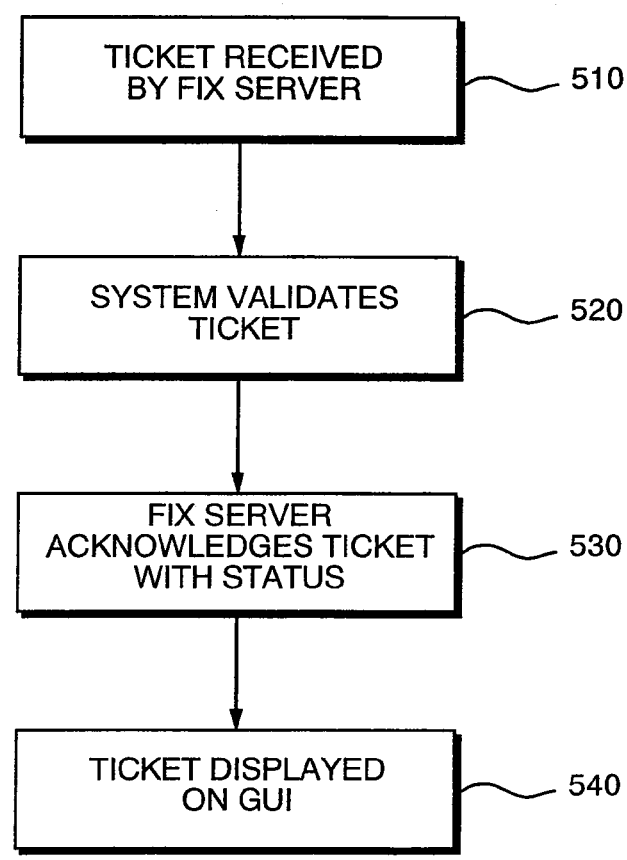
FIG. 5 depicts steps preferably executed while processing a New Ticket.

The following steps are preferably executed while processing a New Ticket (see FIG. 5), after the ticket is received at step 510:

Validation. At step 520, the system preferably processes new orders by first validating the fields in the FIX New Order message. A ticket must have a valid client-ID, a trader-ID (that maps to a unique GUI), security and side (Buy or Sell) and be at least as large as the block quantity for this security. Cloud9 preferably accepts FIX Orders (tickets) identified as "Market" orders and "Not Held", and rejects tickets that have a limit price. In alternate embodiments the restrictions on price and Not Held status are not enforced. A client preferably is only permitted to have one ticket per security on each side; a second buy ticket or a second sell ticket in the same security will be rejected if the prior ticket still had leaves. If the prior ticket was filled or canceled, then you can enter a second ticket; it will replace the first on the GUI front end. An alternate embodiment employs a front end that enables the display of multiple tickets per security and the client is permitted to place any number of tickets. Other business FIX order attributes will be disregarded. Rejected tickets are preferably displayed on the GUI with a reason code.

Processing. The system preferably stores valid tickets in its database 150. The ticket is then displayed on the client GUI via NetServer 110 at step 540, and acknowledged back to the client OMS via FIX 120 at step 530. The table below gives required fields in the Ticket message in the preferred embodiment.

| Field | Description |
| --- | --- |
| ClientID | The firm that enters the ticket |
| ClientTicketID | Unique to this firm |
| TraderID | The GUI that will see the ticket |
| Quantity | Number of shares |
| Side | Buy or Sell only |
| Price | Must be left blank |
| Symbol | Supported within the system |
| Type | Must be Market |
| NotHeldFlag | Must be set |

The system preferably enables users to enter Cancel/Replace Ticket messages. A Cancel/Replace Ticket is preferably submitted as a FIX Cancel/Replace Order with the ClientTicketID of a prior open Ticket and the ClientTicketID of the new ticket. In an alternate embodiment this message may be submitted over an API. In the preferred embodiment, the system carries out the following steps upon receiving a Cancel/Replace Ticket message.

Validation. The system subject of the present invention preferably rejects the Cancel/Replace message if the new quantity minus already-filled quantity (new "Leaves") is less than the system Large Block Quantity for the symbol, or if it is less than the total amount of shares placed on the execution engine as open orders (leaves less than working).

Processing. If it accepts the request, Cloud9 preferably modifies the ticket size to be applied to any subsequent order entry events and pushes the change to the client GUI via NetServer 110. It preferably also acknowledges the change back to the client's OMS via FIX.

Figure 6:
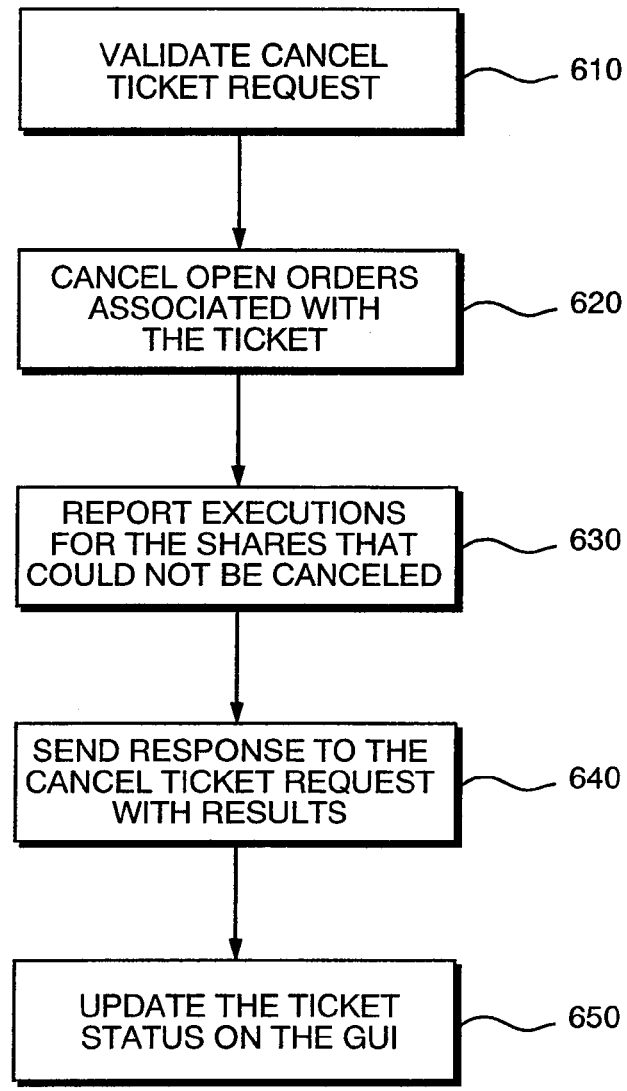
FIG. 6 depicts preferred steps for processes a Cancel Ticket message.

The system preferably enables users to enter Cancel Ticket requests. A Cancel Ticket message is a FIX Cancel Order message with the ClientTicketID of a prior open Ticket. In an alternate embodiment this message may be submitted over an API. The system subject of the present invention processes the Cancel Ticket message as follows (see FIG. 6).

Validation. The system preferably validates the fields of the Cancel Request message in step 610 by ensuring that it points to an open Ticket.

Processing. If there are open orders, in step 620 the system will first try to cancel all open orders associated with the ticket, then report any executions 630 that were done prior to the cancel with messages in flight (this "cleanup" process ends when all related orders are either filled or canceled and the Cloud9 Order Manager's database agrees with the Execution Engine's database on the status of any fills). When any open orders have been cleaned up, in step 640 the system will acknowledge the Cancel Ticket with the results indicating the size that was canceled, if any. A successful Cancel Ticket request will be notified to the Client GUI via NetServer in step 650.

The system preferably enables users to enter New Order messages. A New Order message is preferably submitted through the GUI or API and comprises a request to buy or sell a given number of large block lots of a given security at a limit price or better. In the preferred embodiment the user may also select a pegged price limit, in which case the order will be limited at the less aggressive price between the absolute limit price and the pegged limit price. New Order messages are preferably handled as follows.

Validation. The system preferably validates that orders are for a multiple of the large block quantity in a supported security. In an alternate embodiment the order can be for any quantity. Another step in the preferred order validation process is to verify that the order contains a price field. In an alternate embodiment this requirement is waived if the user has selected a pegged price, in which case a pegged order may float without limit. The Peg types supported in the preferred embodiment are pegging to the NBBO Midpoint, or no pegging at all. Alternate embodiments support additional pegging attributes, as are known to those skilled in the art. The system preferably also validates that the side of the order is Buy or Sell. An alternate embodiment also supports short sell orders. The parameter PegOffset determines the number of cents (or fractions thereof) from the pegged value (NBBO Midpoint) where the order should be priced. The PegOffset attribute is preferably disregarded if the order is not pegged. The system preferably reports rejected orders to the GUI Client with a comprehensible error code. If the client uses ticketing, the validation step also preferably checks that the order does not exceed the size of the associated ticket and is on the same side as the ticket. If the client entering the order has a credit limit with a sponsoring broker, the system preferably verifies as part of the validation process that the order does not violate said credit limit; the credit verification process will be described in greater detail below.

In the preferred embodiment IOC orders are rejected as invalid, since they can be used to probe for information about a standing order that has caused the symbol active flag without showing the contra present flag to the owner of said standing order. In an alternate embodiment IOC orders are accepted but the owner of a standing order can see a flashing Contra present flag (e.g., the symbol changes from orange to yellow briefly then reverts back to orange). In yet another alternate embodiment the IOC orders are accepted and do not cause any flags to be sent out, be it an active symbol flag or a contras present flag.

Order attributes. The system of the preferred embodiment expects to find the required fields in the New Order message as given in the following table.

| Field | Comments |
| --- | --- |
| ClientID | Firm that entered the order |
| TraderID | GUI that entered the order |
| ClientOrderID | Unique to this firm |
| Quantity | Shares |
| Price | Optional if pegged. Pegged orders with a limit act as limit orders if the peg value crosses the limit. |
| Side | Buy or Sell only |
| Symbol | On the Primary Market |
| Time-in-Force (TIF) | TIF is either an absolute time or DAY. All orders expire at the end of the trading day. |
| Peg | MID, NONE. Will execute at the pegged value or better. |
| PegOffset | Signed dollar amount to be added to pegged price |

Figure 7:
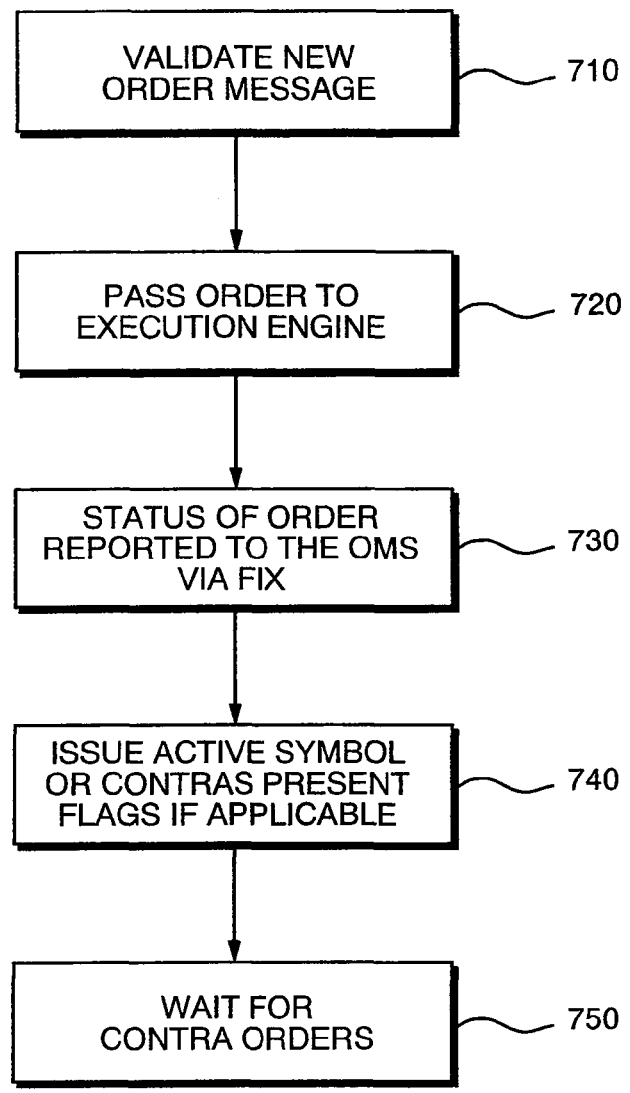
FIG. 7 depicts preferred steps for processing valid orders.

Processing. The system preferably processes valid orders through the following steps (see FIG. 7).

After validation (step 710), valid orders are passed to the execution engine immediately in step 720. The response will indicate whether the order was Rejected, or accepted and placed in the book as an open order, or has an execution pending. The status from the execution engine is reported to the GUI client via NetServer.

If the client uses FIX Tickets, the system preferably reports the order status back via FIX as Accepted or Rejected (step 730); the execution pending status will be reported as Open status in FIX (a subsequent locked-in execution message will follow). The FIX order status update message carries the ID of the associated ticket.

If the Execution Engine indicates that the order is Open, the system will initiate a process 740 through the facilitator with the aim of increasing the likelihood of a trade.

The system preferably determines whether the price is within the latest published value of the Block Price Range (BPR), and if so, tags the order as "aggressive." For this evaluation, pegged orders are priced using a Market Data Cache.

If the order is marked as "aggressive," the system preferably determines whether there are aggressive contra orders in the system. If there are, the Contras Present flag is sent immediately to resident contras that do not already have it, and an event is scheduled to re-evaluate the Contras Present status after a delay of ContrasPresentDelay seconds. If both the first participant's order and at least one contra order are still aggressive and within the BPR at the occasion of this scheduled event, the system sends the Contras Present flag to the first participant.

If the order is marked as "aggressive" and the symbol is not already in an active state, set the symbol in an active state and generate an Active Symbol message.

In step 750 the system waits for contra orders to arrive; each contra order is processed as in this flow starting at the validation step 710. Contra orders with an equal or better price preferably execute at the resident order's limit price.

The system preferably enables users to enter Cancel Order messages. Cancel Order is a GUI/API message with an ClientOrderID corresponding to a prior New/Replaced Order. In an alternate embodiment cancel order requests may also be received via FIX.

Validation. If the order ID is invalid or points to an order that is not known within Cloud9 as being Open, the cancel order request is rejected.

Processing. The system 100 preferably processes Cancel Order requests through the following steps.

Cloud9 OM 130 passes valid cancel order requests to the execution engine 50.

The Execution Engine 50 will respond with the shares that were canceled. The cancel response may be preceded by an execution(s). For filled or expired orders the cancel request is rejected.

Upon receipt of the successful cancel response from the execution engine 50, The order status update is pushed to the GUI Client 20 and the Analytics Server 160.

If the client uses FIX Tickets, also report the status update via FIX. Release credit that was allocated to this order.

Check whether there were contras with a "contra present" flag and remove the flag if the contra present condition is no longer met.

Note: a cancel order does not remove the active symbol flag.

The system also enables the user to enter cancel/replace order requests to modify a prior order. In the preferred embodiment the Cancel/Replace Order is a GUI/API message pointing (ClientOrderID) to a valid prior New/Replaced Order. In an alternate embodiment this message can also be entered via FIX.

Validation. The ClientOrderID must point to a valid order. The system preferably rejects a cancel/replace request if it points to an order that is already known within Cloud9 to be canceled, expired or filled. In the preferred embodiment the system supports pre-trade credit checking. Therefore, if the size of the order is to be increased through the cancel/replace request, the system first verifies that the new size would not exceed the credit limit on the user's account. Replace order requests that fail credit validation are rejected as invalid with a reason code explaining the credit reason.

Cancel/Replace Order processing. Cloud9 OM 130 processes cancel/replace order messages by passing them through to the execution engine. The execution engine 50 will respond with the order status including filled shares, remaining open shares, and average price.

Trade Message. The status update will be pushed to the GUI Client via NetServer 110.

If the client uses FIX Tickets, also report the status update via FIX.

If the cancel/replace modifies the size of the order, cancel and replace credit amount allocated to this order to reflect the new order.

Trade Message. The execution engine 50 reports trades to the Order Manager 130 via a Trade Message. Each Trade Message from the Execution Engine reports a locked-in trade involving exactly two orders.

The Execution Engine 50 will match individual orders against a book of contra orders (one-to-many match). There can be multiple individual trades following a match check, each of which will be processed independently.

Since a trade is a single transaction, both legs of the trade should be reported as a unit.

The preferred embodiment of the system expects to find the following fields in a Trade Message.

|  | Description | Type |
| --- | --- | --- |
| TradeID | Id for this trade | String |
| NewOrderID | The "One" in a One-to-many match | String |
| ResidentOrderID | The contra order | String |
| Quantity | Shares | INT |
| NewAvgPrice | Average share price across all fills of the order. | FLOAT |
| NewFilled | Number of shares filled. | INT |
| ResidenAvgPrice | Average share price across all fills of the order. | FLOAT |
| ResidenFilled | Number of shares filled. | INT |
| Price | As reported to ACT | FLOAT |
| ACTTradeID | As reported to ACT | String |
| TimeStamp | As reported to ACT | HHMMSSCC |
| BidTimeStamp | Most recent quote received on the Bid side (whether or not it caused a price change) | HHMMSSCC |
| OfferTimeStamp | Most recent quote received on the Offer side (whether or not it caused a price change) | HHMMSSCC |

Processing a trade message. The system 100 preferably processes Trade Messages from the Execution Engine 50 through the following steps.

Report both fills to the relevant GUI clients and via FIX for clients that use Tickets or request FIX executions.

Update credit to reflect the actual amount of credit consumed based upon the price of the trade.

If the trader uses tickets and the residual quantity on the ticket is less than the Large Block Quantity for this symbol, expire the remaining quantity on the ticket.

Send Block Tape Message to Net Server for delivery to GUIs that watch this security. The block tape message preferably contains the following fields.

|  | Description | Type |
|---|---|---|
| TimeStamp | Reported by the Execution Engine | HHMMSSCC |
| Quantity | Shares | INT |
| Price |  | FLOAT |
| TotalQuantity | Traded in this security since start of day | INT |

The system preferably enables traders to cancel all orders they have previously placed into the system with a single request, in the event of an emergency. CancelAllClientOrders is a message from Net Server requesting cancellation of all orders that have been entered by a given GUI. In an alternate embodiment this message can also be delivered via FIX. Since the execution engine 50 does not know the customer ID, Cloud9 OM will process the cancel-all message by individually canceling every order associated with this client that has an Open Status, processing these as individual Cancel Order requests.

In order to keep track of the price aggression of orders that are associated with contras present or active symbol indicators, the Order Manager 130 in the preferred embodiment subscribes to BPR Update Messages from the Analytics Server 160 in securities for which it has an open order. Whenever the BPR is refreshed, OM 130 reviews the "aggressive" flag on open orders and updates the flags as follows.

If there is a change in the price aggression flag on an order, re-evaluate if there is a contras present situation for all orders in this security and update contra present flags to ON state when there are contras present for an order that are priced at least as aggressively as the BPR, or OFF if there are no longer eligible contras present. If this results in a change in the Contras Present Status on an order, the system preferably sends a Contras Present Message to affected GUI clients.

The system of the preferred embodiment also updates the active status of an order based on BPR update messages. If the symbol is in an active state, has been in this state for at least 60 seconds, and there are no longer any orders within the BPR, the symbol is set to an inactive state and NetServer sends an Active Symbol message with ActiveSymbolStatus=Not active.

Unsubscribe to BPR update messages. In an alternate embodiment the active symbol status is updated on any BPR update message and may be set to an inactive state even if the symbol has been active for less than 60 seconds. In yet another alternate embodiment the active symbol is updated on every change to the National Market Best Bid and Offer prices and every order entry or cancellation event to ensure that the active symbol flag always indicates that there is a live executable order in the system at this time, priced at least as aggressively as the passive end of the BPR.

Execution Engine.

The execution engine 50 in the preferred embodiment is a decoupled system that communicates with the Order Manager 130 through a communication network 80 such as the Internet. In an alternate embodiment the Execution engine 50 is hosted in the same facility as the Cloud9 system 100 and the two systems communicate over an intranet. In another alternate embodiment the Execution Engine 50 is a component within the Cloud9 system 100; in all these embodiments the functionality of the Execution Engine 50 is as described below. The Execution Engine 50 receives "anonymized" orders, meaning that the order is stripped of the buy-side customer ID, and identified instead by an internal Order-ID and the sponsoring Broker-ID. The Execution Engine 50 processes new incoming orders by checking to see if there are resident orders that match with the incoming order and executing trades with resident orders ranked using price time priority, as we describe in more detail below.

The Execution Engine 50 in the preferred embodiment is the book of record for recovering the true status about any Cloud9 trades in the event of a failure.

The preferred embodiment of the Execution Engine 50 supports Limit orders and orders pegged to the NBBO Midpoint. In an alternate embodiment other order types known to those skilled in the art are also supported. For example an alternate execution engine may support price discretion orders that are executable at a limit price against market orders, but may automatically increase their price aggression to trigger a match with an incoming limit order up to a predetermined discretion amount. In another example of an alternate embodiment, the system enables traders to enter orders that are to be priced at a later time based on a volume-weighted average price (VWAP) for a forward time interval, such as the VWAP from the time of the trade until end of day, or the VWAP over a specified time interval, such as a half hour interval.

The orders in the preferred embodiment can be described as limit orders with an optional Peg. All orders are required to have a limit price; if they have a Pegged price as well then the order is considered to be priced at the more passive price between the limit and the pegged value. Pegged orders are priced on the occasion of a match check event and are then treated the same as a limit order at the more passive of the limit or pegged prices. The pegged value is the NBBO Midpoint plus a Peg Offset amount.

Users in the preferred embodiment will use the Peg as a protection on a limit order to ensure that if the market moves swiftly, their order does not trade at a price that suddenly stands at a very aggressive level as compared to the NBBO prices. The GUI 20 suggests this way of using a Peg by representing the feature as "Price protection" and offering the option to "not trade more than <n> cents from the NBBO midpoint price."

Because there are both pegged orders and limit orders in the system, a match may also be triggered not on order entry, but as a result of a change in the NBBO prices that would cause a pegged order's price to cross a contra order's limit price.

Therefore, in the preferred embodiment of the present invention, a match can be triggered either on entry of a new order, or on a change in the NBBO prices that causes a pegged order to cross with other orders. The system preferably implements the following process to identify such matches.

The Execution Engine 50 preferably comprises a component that receives all quote update messages from the data provider 60 and keeps track of the current best bid and best offer, using information caching techniques that are known in the art. It preferably also enables a component of the Execution Engine 50 to subscribe to price updates for a given security, whereafter it will receive a message whenever the best bid or the best offer in the given security changes.

The Execution Engine 50 preferably maintains a list of symbols for which it has one or more Limit Orders on one side and one or more Pegged orders on the other side and subscribes to NBBO price changes for all securities in this list. Pegged orders with a limit price count both as pegged orders and as limit orders for the purpose of the present description. For the symbols within this list, Execution Engine 50 will process each NBBO price change by pricing all pegged orders in the security and then ranking all orders on the buy side and on the offer side in price time priority.

The system preferably proceeds to identify matches by taking first the top-ranked buy order, and processing trades between this order and sell orders in price time priority. If there are still unfilled sell orders, it proceeds with the second-ranked buy order and again processes trades with the yet-unfilled sell orders in price time priority.

The Execution Engine 50 will preferably observe trading halts on the primary market as follows. While a security is halted, all existing and new orders will be declined. The Execution Engine 50 derives the security-trading status from a Data Vendor 60. If the Data Vendor 60 is unable to provide the service or the corresponding communications network 70 fails, the Execution Engine does not process any trades but simply waits for the vital services to be re-established.

The market data feed in the preferred embodiment contains the market halt information as well as level 1 and last sale data for purposes of the Analytics Server 160.

If a New Order triggered the match, the Execution Engine preferably reports the execution pending immediately to Cloud9 OM 130 with the expected total match quantity. This report is informational only for use by the Facilitator 140 and does not guarantee that the trade will clear, as we will see below.

A trade is preferably processed as a single transaction, as is known in the art, to avoid the risk of the system reporting one side of the trade and not the other in the event of a failure. The processing involves the following steps.

1. Report the trade to the regulatory organization as required and update the order status in the database. In the preferred embodiment the trade is reported to the Nasdaq ACT system. The matching engine reports to ACT immediately for data dissemination (tape reporting) and for clearing purposes.
2. When the trade is successfully locked in for clearing (ACT acknowledges trade reports and assigns an ACT report ID), the Execution Engine 50 preferably sends a firm trade report message to the Order Manager 130. Trades involving pegged orders are preferably reported with the timestamp of the most recent bid and the timestamp of the most recent offer that were used to calculate the NBBO midpoint, as well as the timestamp at which the execution was processed.

The Execution Engine 50 processes incoming messages as follows:

New Order Processing. New Order is a message from the OM 130. It is preferably processed as follows.
  Identify matching orders, if any, and acknowledge order entry with status to the Order Manager 130.
  If the order is not filled but causes a situation where there are limit orders on one side and pegged orders on the other, register for NBBO price updates in the security.
  Process any trade as described above.

Cancel Order. Cancel Order is a request from Cloud9 OM to cancel an open order. It is preferably processed as follows.
  Verify whether the Cancel Order request carries a valid order ID that points to an order in the Book 51.
  If the order has already been traded, reject the cancel order request message
  It the order is not yet traded:
    Mark the order status as canceled in the Execution Engine database (Book 51).
    Report the successful cancel status to the Order Manager 130.

In the preferred embodiment an order can be modified or canceled at any time. In an alternate embodiment the orders are required to have a minimum time in force of 10 seconds to give other participants a reasonable time to react to events triggered by the Facilitator 140, such as an Active Symbol flag or a Contras present flag.

The system preferably also enables the Order Manager 130 to request cancellation of all orders associated with a given sponsoring broker, or all orders altogether. The Execution Engine 50 processes such aggregate cancel order requests by first identifying all affected orders and then processing the cancel order requests by time of entry of the orders.

The Execution Engine 50 preferably validates connectivity with the Order Manager 130 using 30-second heartbeats. On loss of connection, the system preferably cancels all orders.

NetServer.

The system preferably comprises an Application Programming Interface that enables a client GUI 20 to connect to the NetServer 110 through a communications network 80 such as the Internet. NetServer 110 allows customer front-end applications to access Cloud9 trading services such as the viewing of BPR updates and entry of orders in to the system.

If loss of connectivity to a client is detected, Cloud9 preferably attempts to cancel all the client's orders with the Execution Engine 50. In an alternate embodiment the system allows clients to select a configuration wherein the loss of connectivity does not cause cancellation of open orders; clients that elect this alternate configuration then have to call the Help Desk to cancel orders in case of an emergency.

NetServer 110 passes trading activity messages (orders, cancel/replace, cancels) to the order manager and passes responses and unsolicited messages back to the client. It also stores client GUI configurations, such as the location and size of windows on the screen and the list of securities that the trader wishes to watch. These examples do not constitute an exhaustive list but instead are intended for the purpose of illustration only; other configuration parameters are stored to support normal GUI display options as can easily be apprehended by those skilled in the art.

In a preferred embodiment, the GUI enables traders to view credit alerts generated by the system when the amount of available credit falls below the dollar amount typically required to execute a large block trade. In an alternate embodiment credit alerts are not displayed and the user simply discovers the absence of sufficient credit upon the failure of an order entry request.

Figure 1:
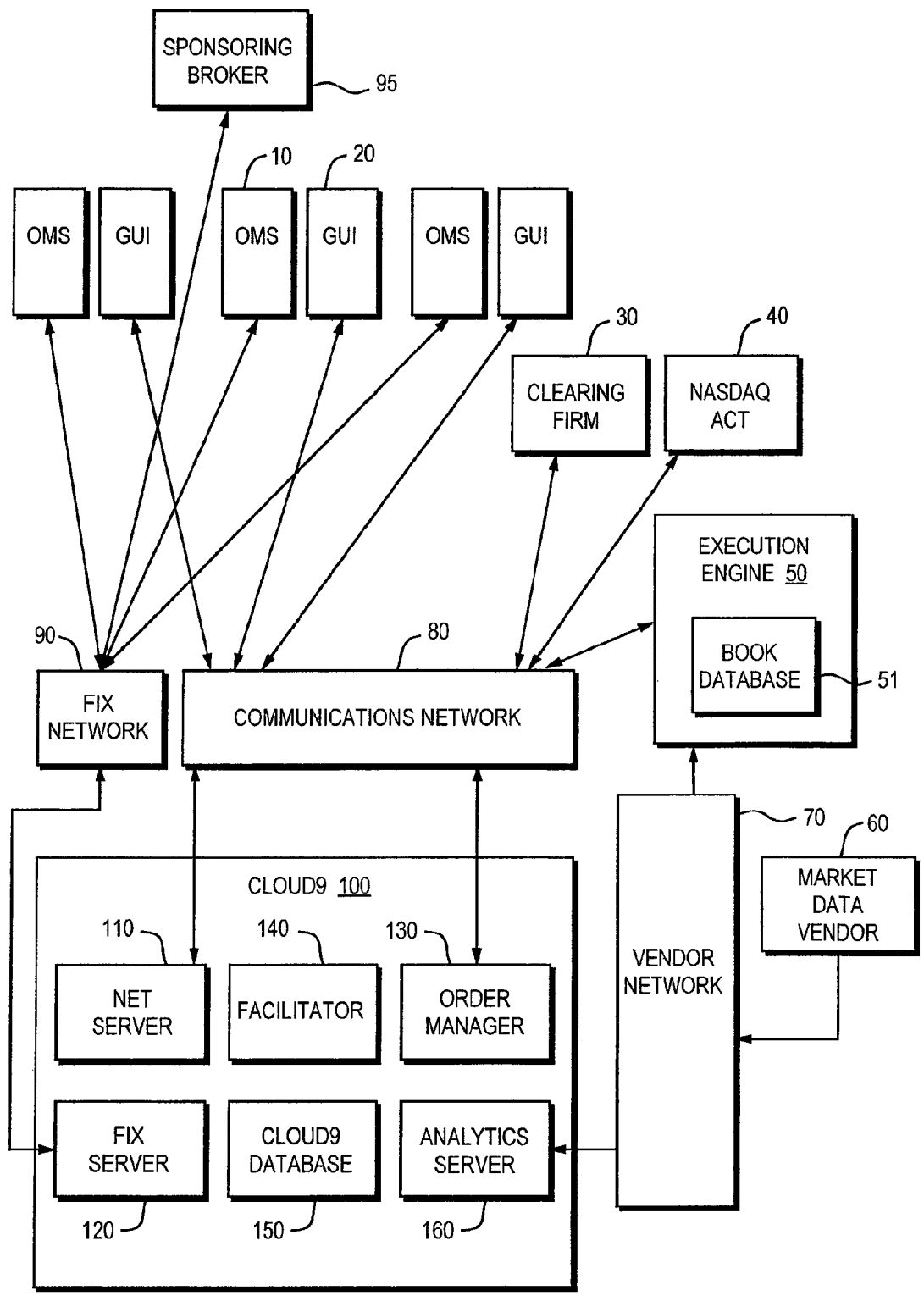
FIG. 1 is a schematic view of a preferred computer system embodiment of the present invention.
Figure 2:
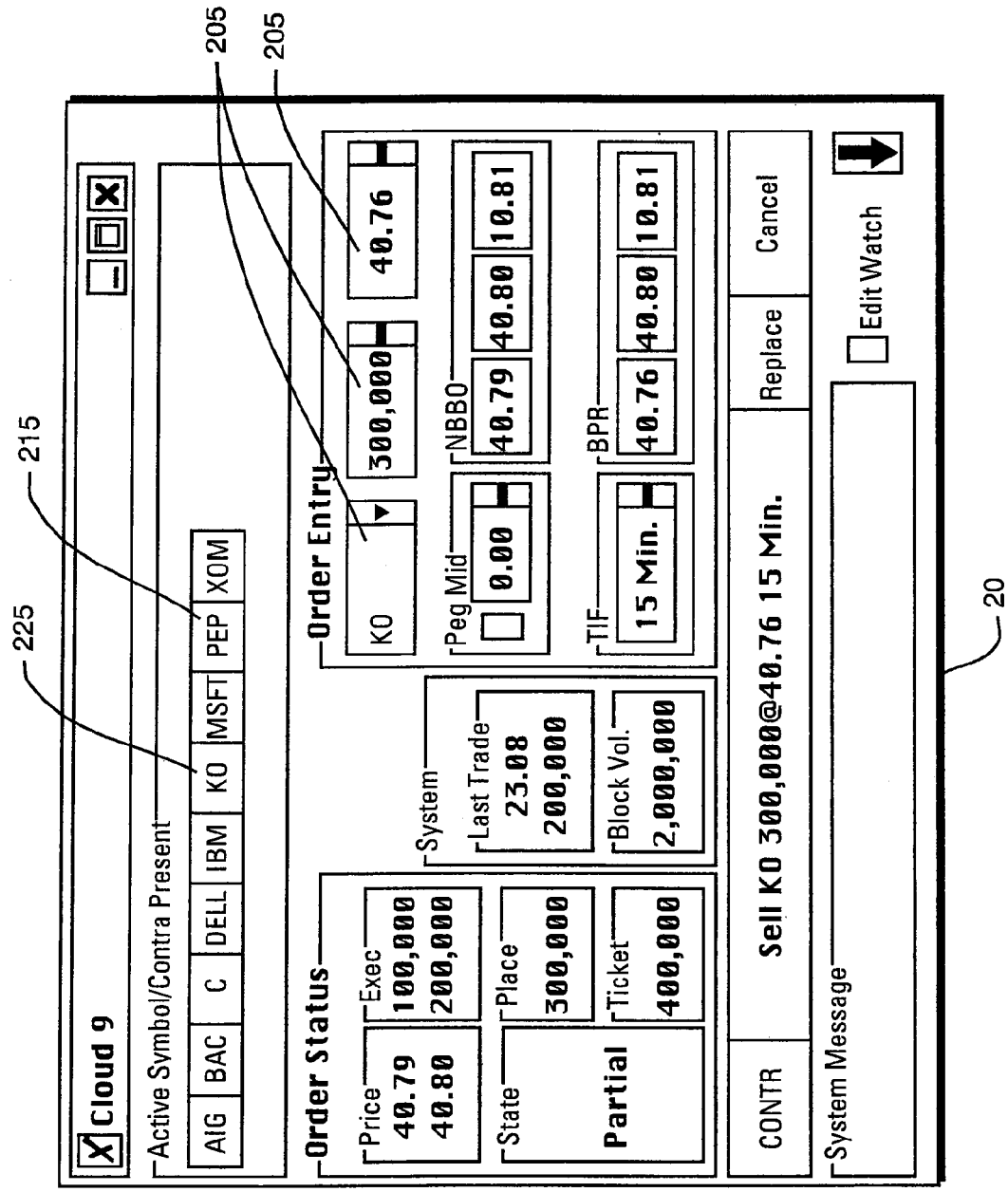
FIG. 2 depicts a preferred GUI wherein an order entry dialog is open.

In the preferred embodiment of the subject invention, the GUI 20 enables traders to access a dialog that facilitates management of a watch list of securities. The purpose of the watch list is to limit the flow of information from the system to the symbols that the trader is interested in. In the preferred embodiment, the system also enables a trader to see whether or not there is someone else with an open GUI currently watching a given symbol (this being of interest since it would increase the likelihood of a trade). In an alternate embodiment the GUI 20 enables users to see the number of traders watching a security. The GUI 20 will register for BPR update messages and for receipt of the Active Symbol and Contras Present messages only in watched securities. In the preferred embodiment the API allows a GUI to register for BPR/Active/Contras Present messages in any security, and separately register for quote update messages in a separate list of securities. The preferred GUI 20 only displays NBBO prices for one security at a time, namely the one for which the order entry dialog is open, as depicted in FIG. 2. In an alternate embodiment the GUI subscribes to NBBO updates in all watched securities and these prices are displayed next to the symbol in a drop list.

To manage the watch list, users are preferably able to add individual symbols, or add all symbols that are classified as being in a known group of securities, such as an industry group or a sector. The system preferably also enables users to submit their own groups of securities in the form of an Excel file and load these groups into the system, at which point they are simply added to the list of groups of securities that the trader may choose from to populate his or her watch list.

Figure 8:
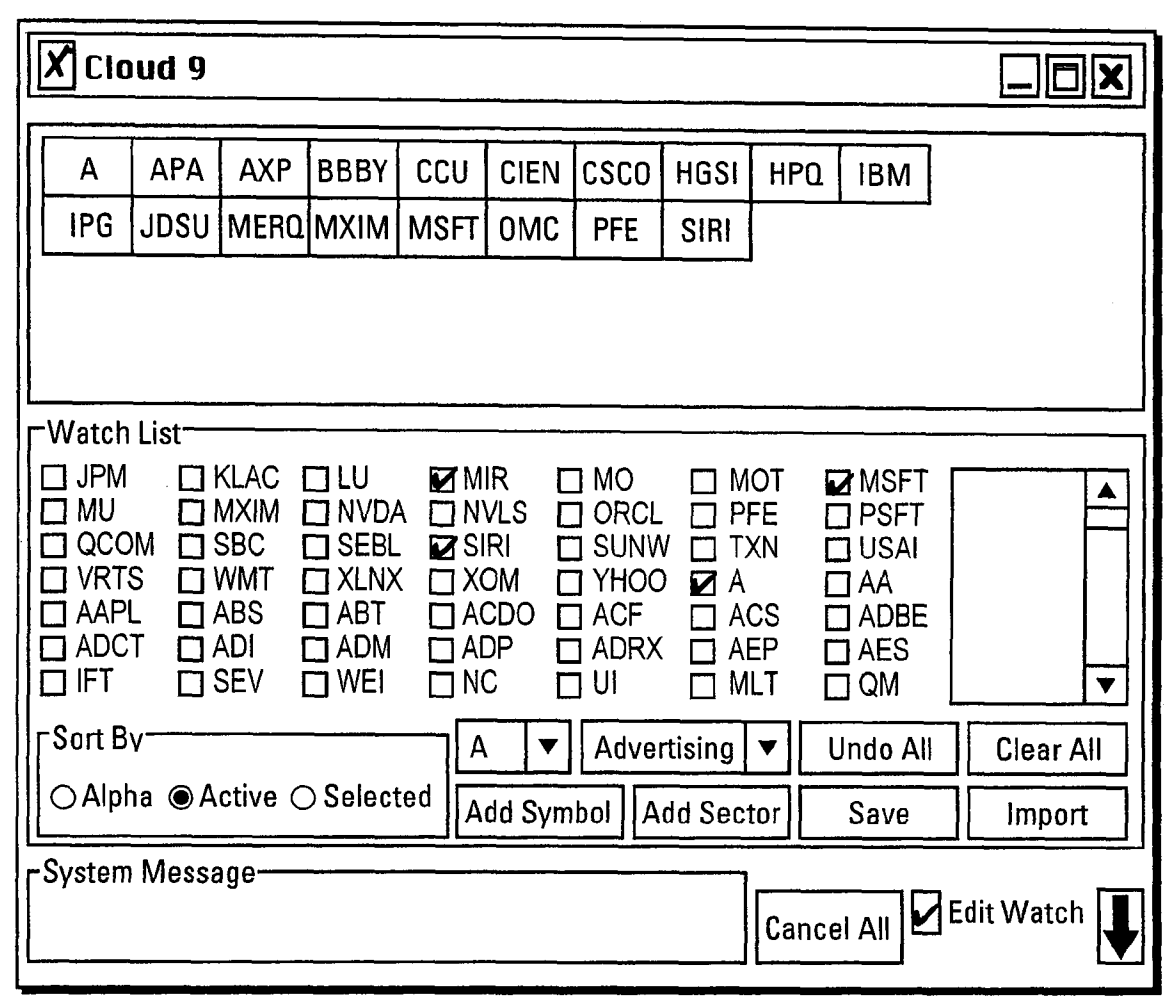

A preferred watch list configuration dialog is depicted in FIG. 8. The user is able to add symbols or groups of symbols. The changes are in a pending status until the user saves the changes. Users can also revert to a prior saved watch list or load a group of securities from an Excel spreadsheet which can be, for example, derived from their OMS or blotter.

The watch list is preferably managed by the client and persisted on the server.

In a preferred embodiment Net Server 110 keeps track of which symbols are being "watched" by two or more GUIs. If a symbol is added to a trader watch list, causing the number of watching clients to reach two, NetServer 110 will broadcast a message to all GUIs that subscribe to active symbol messages to indicate that the symbol is watched. If the number of watching GUIs drops to one, NetServer will broadcast a message to the GUIs that subscribe to active symbol updates to indicate that this symbol is no longer being watched. In an alternate embodiment the message is sent any time a user adds or removes a watch on the symbol and gives the symbol, timestamp, and updated number of parties watching the symbol.

The GUI 20 preferably shows all symbols that are both in the trader's watch list and are either active or have contras present, by highlighting them on the top of the GUI through color-coded rectangles, using the color orange for active symbols and yellow for contras present. In an alternate embodiment the messages indicating that a watched symbol has become active or has contras present is displayed by means of a temporary popup screen, similar to instant messenger applications. In another alternate embodiment these popup messages stay visible until action is taken, either by clicking to generate an order entry dialog and entering an order in response to the message, or by clicking on a "close" or "minimize" button to either close the popup or reduce it to a bar at the bottom of the screen.

The trader GUI 20 in the preferred embodiment has the option of showing or not showing the symbols on their watch list that are in a "watched" state (i.e., at least one other trader is watching this symbol). If they choose to see these symbols, when they are not "active" or with contras present they will be represented in a third color that is less striking than the other two since the trader's attention is not immediately required; in the preferred embodiment the GUI 20 presents watched symbols in a gray rectangle next to the active and contras present rectangles.

The NetServer 110 preferably exposes an API for remote clients to access the system's services. The API preferably enables the user to open a session though basic authenticating (username password) prior to using any trading services. In an alternate embodiment the client authenticates itself with a certificate. The exchange of user credentials is preferably done via a SSL session, which exchanges encryption keys using the Net Server public key. Once the user is authenticated the session maps to the users identity.

The NetServer API preferably exposes the following functions.

Get Sector List: Each firm can optionally have securities arranged by sector or other security grouping. The security groupings can be configured per client firm. The API returns the list of securities associated with the client's firm and group name.

Get Security List: The system has a list of configured securities. This function returns that list. Each element of the list is the Symbol, Company Name, and Sector.

Set & Get Trader Defaults: The system enables a client to store default parameters. The following list is not intended to be exhaustive, but contains some of the trader defaults that are of particular interest; others will be apparent to those skilled in the art.

Default Placed amount. The order entry dialog will populate the quantity field by default with either the minimum quantity for this symbol (Large Block Quantity) or with the trader's total ticket size, if this trader uses tickets.

Default Price. The order entry dialog will populate the price field with a limit price chosen via one of the following rules: Aggressive end of the NBBO, passive end of the NBBO, NBBO Midpoint, Aggressive end of the BPR, Passive end of the BPR, or BPR Midpoint.

Default TIF. The order entry dialog will populate the time in force field with this number of seconds.

Default Watch List Management (Security, Sector). All watch list management is handled by the front end and persisted on the server.

Default Peg and offset. The order entry dialog will select or not select the Peg option by default and if selected, it will add this number of cents as peg offset for buy orders, or subtract this number of cents to the midpoint peg for sell orders.

Ticketed Orders Only. This option determines whether a trader wishes to check orders against the size reserved by means of a ticket. If this option is not selected, the trader will be able to enter orders even when there is no corresponding ticket.

Set & Get Sector Watch List: Save and retrieve a list of securities that comprises a sector or other group.

Set & Get Symbol Watch List: Save and retrieve the list of securities that are in a given watch list.

Set & Get GUI Defaults:

Ticket Management Grid: option to start the application with the window that displays the list of tickets open or hidden.

Ticker Management Grid definition: font, field order, col size, col type, headers and field=col mappings.

Active Symbol list (open or close). Option to start the application with the window that shows the list of active symbols open or closed.

Color Changes (Yes, No): The GUI preferably allows users to select this option to highlight any field of an order in the order entry dialog when the order has already been submitted to the system and this field has since been edited. When a field has been edited the user can press a "replace" key to send the new value to the system via a Cancel/Replace order message. Highlighting the fields that have been edited assists the user in managing an order.

Get Heartbeat Interval. Number of seconds for the periodic heartbeats to determine whether the connection between the GUI 20 and Net Server 110 is operational. The system preferably imposes a lower bound on this parameter to avoid overloading NetServer 110 with connection management duties. In an alternate embodiment the parameter can only be set on the server and is not exposed via the API.

Get Tickets: gets the user's tickets. Within the trading day, the user can only have one ticket per symbol/side. If the ticket is cancelled, the size decrements to the unexecuted size. New tickets with the same symbol and side replace the entry in the list.

Get Orders: Gets a list of all orders.

Get Order Status. Returns the order details for the ClientOrderID.

Submit New Order: Queues a new order into the system. Asynchronous call that will be followed up with OnOrderUpdate or OnOrderReject event(s).

Replace Order: This function queues a replace order request. The caller assumes the order state to be in "Pending Replace" upon return. Asynchronous call that will be followed up with OnOrderUpdate or OnOrderReject event(s). Replaced Order details are the same as New order details+OrigClientOrder ID field. The quantity is the total quantity including filled size.

Cancel Order: This function queues a canceled order request. The caller assumes the order state to be "Pending Cancel" upon return. Asynchronous call that will be followed up with OnOrderUpdate or OnOrderCancelled event(s).

Execute Trade. This function requests that this trade be reported to the sponsoring broker to set up allocation process. This would be done automatically at the end of the trading day.

Get Trades for (ClientOrderID, Symbol, or ALL) Request/response to retrieve trade details. There are preferably three versions of this request. Get trades for an order, for all orders in a security, or for all trades for this GUI client.

The following are API events—i.e., messages produced by the system and pushed to the GUI 20 through the API.

OnTicketUpdate: this event is raised on new, replaced, and cancelled ticket events.

OnOrderUpdate: Event raised on order state changes. This includes order management responses to the requests above or through other channels.

OnOrderReject: Event is raised in response to a new/replace order request entered within this session.

OnCancelReject: Event is raised when a cancel request is rejected.

OnTrade event is raised when there is a trade within one of the traders orders entered through this API or another channel.

The preferred embodiment of the NetServer 110 also provides an interface for subscribing to market data per security. Fields include: (NBBO bid, ask and TapeTimeStamp), (BPR Low and High), Block Tape (Last and total volume), Active Symbol, Contras Present, Security State (open, closed, halted, etc), and timestamp. The functions exposed in the preferred embodiment of this interface are:

Subscribe Request/Response: This function preferably adds a list of securities provided in the request message to the client's subscription list. The request returns a snapshot of that entry's current data for the requested fields. Subsequent changes to the watched fields will raise an update event (OnUpdate) with the changes.

Unsubscribe Request/Response: Removes the subscription request.

OnUpdate Event: Notifies the subscriber of field changes within a Subscription entry.

Start Active Symbol Feed Request/Response: Returns a list of all symbols where the active symbol flag is set. Subsequent to the call, all state changes in active symbol flag changes will result in OnActiveSymChange(Symbol, On/Off).

Stop Active Symbol Feed Request/Response: terminates above event notifications.

OnActiveSymChange event notifies the subscriber of active symbol flag changes

Research Data Storage.

The system preferably stores information that allows operators and research staff to evaluate how indicators of trader activity in a symbol correlate to fill rates when users enter orders. This information plays an important role in steering usage of the system toward workflows that lead to greater success, through marketing media and visits to the traders' stations. For example, if the fill rate following entry of an order in a security that is not watched is extremely low or null, traders may be advised to focus their trading on the system in securities that are watched by other traders. The system preferably also can be reconfigured to modify the rules of when flags are sent out, to improve fill rates in the system. For example, if it is determined that fill rates are substantially higher when there are three or more traders watching the security than two, then the system can be reconfigured to send out the watched symbol message only when the total number of GUI users is three or more, rather than two or more. The above examples are intended for the purpose of illustration and not to provide an exhaustive list; other optimizations based on modifications of parameters given above will be apparent to those skilled in the art.

The trader activity measures are available on the help desk, and exported to a permanent data repository at the end of each day for offline analysis with the purpose of finding correlations between possible system configuration settings and higher fill rates.

The measures of interest are:

Order activity (entry, BPR aggression changes; cancel/expire)

Fills

Tickets

Number of traders that can see the symbol active flag (on watch list, as a symbol, or as part of a sector)

Number of traders that can see the BPR updates (subscribers)

Number of traders that can see the quote updates (subscribers)

The data tables below (A-D) are stored in standard comma-delimited (CSV) format.

TABLE A

Ticket Table

| | Description | Type |
|---|---|---|
| Timestamp | To hundredth of a second | HHMMSSCC |
| Symbol | | CHAR[5] |
| Quantity | Multiple of the Large Block Qty | INT |
| Side | Buy, Sell | Enum |

TABLE B

Order Table

| | Description | Type |
|---|---|---|
| Timestamp | To hundredth of a second | HHMMSSCC |
| Symbol | | CHAR[5] |
| Quantity | Multiple of the Large Block Qty | INT |
| Side | Buy, Sell | Enum |
| BPR | Yes/No | Boolean |
| Status | Open, Rejected, Canceled, Expired, Filled | Enum |

TABLE C

Trades Table

| | Description | Type |
|---|---|---|
| Timestamp | To hundredth of a second | HHMMSSCC |
| Symbol | | CHAR[5] |
| Quantity | Multiple of the Large Block Qty | INT |
| Side | Buy, Sell | Enum |

TABLE D

Watch List Table

| | Description | Type |
|---|---|---|
| Timestamp | To hundredth of a second | HHMMSSCC |
| Symbol | | CHAR[5] |
| SymbolActiveWatchers | Number of clients who are able to see the symbol active flag (symbol is on their watch list) | INT |
| BPRWatchers | Number of clients watching the symbol BPR updates | INT |
| QuoteWatchers | Number of clients watching quote updates for the symbol | INT |

Analytics Server.

The Analytics Server 160 in the preferred embodiment keeps track of the National Best Bid and Offer prices by listening to a vendor quote feed 60 and updating said NBBO prices when the quote that made the best price is either canceled or improved by a new quote with a better price. The current NBBO prices are preferably stored in a cache using methods well known to those skilled in the art. In addition to the NBBO prices, Analytics Server 160 calculates a Block Bid and a Block Offer based upon recent quote and trade data.

The Analytics Server's main function is to produce the following messages:

NBBO price changes.

Block Price Range updates.

The analytics server will store last sale data and all changes in the inside bid or offer prices throughout the day, in all supported securities. The data that needs to be stored for analysis is described in the Tables E and F.

TABLE E

Inside Market Price Updates

| | Description | Type |
|---|---|---|
| Timestamp | To hundredth of a second | HHMMSSCC |
| Symbol | Primary market symbol for the security | CHAR[5] |
| ChangeType | New Bid, New Offer, Both | Enum |
| BidPrice | In unit 1 cent ticks | FLOAT.2 |
| OfferPrice | In unit 1 cent ticks | FLOAT.2 |
| SecurityState | Trading state of the security (open, closed, halted, etc) | Enum |

TABLE F

Last sale

| | Description | Type |
|---|---|---|
| Timestamp | To hundredth of a second | HHMMSSCC |
| Symbol | Primary market symbol for the security | CHAR[5] |
| Quantity | Size of the trade | INT |
| Price | To tenths of a penny | FLOAT.3 |

The Analytics Server 160 delivers quote update messages to all connected clients whenever there is a change in the inside market best bid price or best offer price. The update message carries the new bid price or new offer price and timestamp associated with the appearance or removal of the quote that changed this bid or offer.

The Analytics Server 160 preferably also updates the BPR every 60 seconds, and sends a BPR Update message to the Order Manager 130 for the purpose of determining the price aggression of its orders and to Net Server 110 for broadcasting to GUI Clients 20.

The preferred embodiment comprises a replaceable module that is responsible for calculating the BPR. The BPR can be calculated using methods known to those skilled in the art, such as for example by taking a Block Bid equal to the National Best Bid price minus 5 cents, and a Block Offer equal to the National Best Offer plus five cents. In another example, the amount of cents to be added (subtracted) to (from) the NBBO prices is set in proportion to the historical volatility of the stock, so that for very volatile symbols such as technology issues the variation might be greater than 5 cents, while it would be less for more steady stocks such as blue chip utilities.

Figure 9:
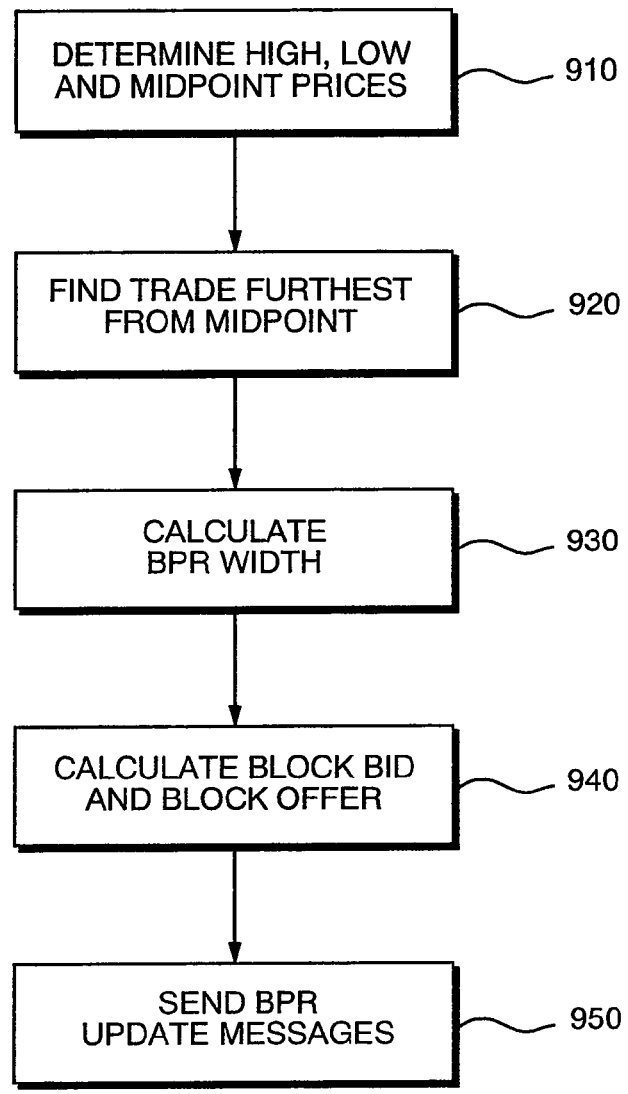
FIG. 9 depicts steps of s preferred method for calculating BPR.

The algorithm used in the preferred embodiment of the present invention considers the highest and lowest prices that have traded in the past 60 seconds, H and L respectively, as well as the current NBBO Midpoint price M, and calculates the Block Bid and Block Offer through the following steps [FIG. 9]:

Step 910. Determine the prices H, L and M for a given security as defined above.

Step 920. Looking at last sale data back to the timestamp of the last BPR update, find the trade that was printed furthest from the current NBBO midpoint. Let X denote the absolute price difference between this trade price and the current NBBO midpoint. Thus, X is the greater of H−M and M−L.

Step 930. Let $Z=Y+(MaxBlockSpread/2-Y)*(1+1/(1+exp(-BETA*X)))$, where Y is a parameter set per security that sets a lower bound on the spread between the Block Bid and Best Offer, MaxBlockSpread is the upper bound on said spread, and BETA is a parameter, which can be set to 10.0 for example.

Step 940. Calculate the Block Bid to be equal to M+Z, and Block Offer equal to M−Z.

Step 950. Issue BPR Update messages to the Order Manager 130 and NetServer 110.

Credit Management.

The system preferably enables sponsoring brokers to set credit limits on their customers' accounts. In the preferred embodiment, credit checking is based on a gross dollar limit, counting the total value of shares bought plus shares sold. Orders will be validated for credit based upon the greater of the top of the BPR or the order's limit price, and credit will be adjusted based upon the actual credit amount consumed when the order is completely filled, expired, or canceled (on partial fills).

- Brokers will be given a web account to manage credit; they can view the level of credit currently consumed by a client, but only binned as follows: less than 25%; 25-50%; 50-75%; more than 75%.
- Brokers must be able to increase today's credit with immediate effect; or they can increase or reduce the amount of credit that gets refreshed at the start of each trading day. A broker can also suspend credit; this has effect both intraday and for following days. If day's credit is suspended, the system will cancel all open orders.
- The broker can later un-suspend credit for a client. Suspensions have permanent effect and persist into the next day. Credit is refreshed at the end of the day.
- The broker will be able to set up a credit alert threshold as a percentage of the total (default=75%); additionally, the system will generate an alert whenever the available credit falls below a system-configured dollar amount MinCreditAmount that is too low to utilize the block system (for example, $2 million). Credit alerts will be delivered to Help Desk personnel and pushed to the client GUI.

Help Desk.

The system preferably provides a Help desk interface to be used by personnel that handles calls from customers. This user interface can be a web browser interface, with access secured through Public Key Encryption and certificate-based authentication as well as a username and password pair. The interface preferably enables the user to view detailed information about the life of an order. The user can pull up the list of orders with a given symbol and client ID to locate the order that the customer is calling about. The help desk interface enables its user to click on an order of interest to view the following messages in chronological fashion.

- Ticket, if applicable.
- Order Entry request(s).
- Order Entry Response: rejected (with reason code); execution pending; expired; open.
- Fills.
- Contras present flag(s) sent against an order.
- Modify Order Requests, and responses (accepted, rejected).
- Cancel Request and response (accepted, rejected).
- Expiration.

In addition, the help desk operator is able to see the NBBO inside prices, timestamp of the most recent quote seen on the bid and offer sides, respectively, BPR prices and timestamp, on each significant event in the life of an order (entry, cancel, execution). This is of use for answering questions such as why the symbol did or did not change to an active state when the order was entered, etc.

In an alternate embodiment the help desk operator cannot view symbol or side of any order, to reduce the security risk associated with traders being aware of the trading interests of institutional customers. In this embodiment, the help desk operator identifies a caller's order by pulling up the list of orders associated with the trader, with the time of entry and size of each order as well as the ClientOrderID which is also visible on the trader's GUI 20. The help desk operator works with the trader to identify which order he or she is inquiring about, then proceeds as above by clicking on the order to view the corresponding activity trail.

In the preferred embodiment the Help Desk also enables its operator to select a client firm from a drop list, and view their configurations pertinent to trading logic. The list below gives the more important user configurations and usage statistics for the help desk operator; the list is not intended to be exhaustive, others will be easily apprehended by those skilled in the art.

- Credit limit and credit consumed.
- Activity by trader: number of orders, traded shares, traded dollars.
- List of trader; select one to view and edit trader options.
- Watch list management (add/remove symbol, add/remove industry group).
- Show/don't show active symbols bar.
- Show/don't show drop list of tickets.
- Default ticket attributes.

The preferred embodiment also enables brokers to access a web page using the same authentication and security model as for Help Desk operators. Brokers will use this page for credit management purposes. In order to maintain the client's confidentiality, the interface preferably limits the information displayed to the broker in such a way as to not reveal the details of the client's trades. In this embodiment, the broker can view the amount of credit consumed by a client only as a percentage of the total credit limit; for example, this can be binned in four intervals: less than 25%, 25-50%, 50-75%, and greater than 75%. The sponsoring broker additionally is enabled to modify the client's credit through the following functions.

- Add intraday credit.
- Add credit today and also increase the refresh amount for following days.
- Lower refresh amount for following days.
- Suspend credit.
- Unsuspend credit.

In an alternate embodiment the trades are reported to the sponsoring broker immediately and the sponsoring brokers are able to view executed trades as well as the precise amount of credit consumed. In another alternate embodiment the sponsoring broker can also view pre-trade activity.

System Configurations Interface.

The system preferably enables an operator to modify the configurations, and add/remove a client or sponsoring broker, during an off-hours system maintenance schedule.

The system configurations interface enables the system operator to add a client and set required configurations attributes to enable the user to trade. New client firms must choose a sponsoring broker from a list of available brokers. The sponsoring broker is preferably unique for all traders within the same firm. In an alternate embodiment the same firm can use a plurality of sponsoring brokers, and the GUI 20 lets the trader select a sponsoring broker on order entry. The new firm can optionally set up FIX communications directly to FIXServer 120, or through the sponsoring broker 95. In the latter case the sponsoring broker forwards FIX messages from the client to FIXServer 120 on its behalf. A firm may select two modes of FIX connectivity depending on their workflow requirements: FIX channel can be set up to receive Executions only, or to receive Executions and Order updates.

They can be set up to enter tickets and check GUI-entered orders against the size allocated through a ticket, or to work without the use of tickets. When a client firm is added to the system, the Help Desk personnel will call the broker to set up any credit limits for the customer's account, and agree to a client-ID to be used for end of day reporting. New users are preferably required to configure GUI/API access to be able to trade on the system. In an alternate embodiment order entry is also supported via the FIX interface, and the user is not required to use the GUI 20 or API access.

The system configurations interface preferably also enables the system operator to add a sponsoring broker to the list of supported brokers. In an alternate embodiment the system is operated by a single sponsoring broker and cannot be accessed through a third party broker relationship. In configuring a sponsoring broker, the operator will create a user account for the sponsoring broker to manage credit for their clients' accounts as described above. Broker contact information such as a telephone number, FAX, and email must be entered and stored in the system database 150; Help Desk personnel will utilize this data to contact the broker for credit issues. To complete the process of setting up a new sponsoring broker the following steps preferably are executed.

- Brokers must set up a FIX connection to receive drop copies of all executions. If the broker is also used as a service bureau for the client's OMS and sends Tickets on behalf of the clients, then this same connection will be used also for FIX connectivity to the client.
- Set up end-of-day file transfers from the system containing the details of each trade, including the identity of the buy-side customer for each trade.
- Optionally, set up end-of-day file transfers to the broker's clearing firm at end of day with the sell-side trade details.

The operator is further enabled to add or remove securities from the list of securities supported for trading. The securities are preferably associated with parameter values specific to the present invention, such as the Large Block Quantity and parameters utilized by the Analytics Server 160 to calculate the Block Price Range. An example of a set of required fields for a security is given in the table below.

|  | Description | Type |
|---|---|---|
| Security | Name of the security (optional blob) | String |
| Symbol | On the primary market | Char[2, 3, 4, 5] |
| Primary market | NYSE, Nasdaq | Enum |
| LargeBlockQuantity | Orders must be multiple of this quantity | INT |
| MinBlockSpread | Minimum number of cents between the block bid and block offer | INT |
| MaxBlockSpread | Maximum number of cents between the block bid and block offer | INT |
| Beta | Squashing parameter to renormalize the Block Spread | FLOAT |

System Operations.

The system in the preferred embodiment preferably comprises an operations console used to provide centralized management of the servers, network hardware and trading. Operations software to support required functions is commercially available in versions that minimally provide the following features:

- Real-time Display of all server statistics
- Problem Summary
- Problem Resolution Feedback
- Remote Management/Monitoring
- Intelligent Notification System (Alerts)
- Alert Display, Acknowledgement, and Annotation
- Audible Alarm
- Logging
- Online Help The operator console allows the system operators to execute the following remote actions:

- System Startup
- System Restart
- System Shutdown
- System Component Restart
- System Component Shutdown
- System Component Startup
- System Backup
- Database Backup
- Inner Day Startup/Shutdown
- End-of-Day Reset
- Execute End-of-Day Batch Processes The system additionally enables the operations staff to generate the Daily Usage Reports at the end-of-day and extract from these the necessary information for billing, research, clearing, and OATS reporting.

The operations staff preferably also uses a system operations tool to create a clearing summary, which contains a list of trades with the broker IDs for both sides of the trade. Trading summaries pertinent to a sponsoring broker and its clearing firm contain all trades where at least the given broker sponsored one of the sides.

The system preferably also generates billing reports containing a list of all fills involving a sponsoring broker for sending to the broker. The fills should match intra-day execution reports one-to-one. The end-of-day report additionally contains the client ID, which was masked in the intraday reports. If both legs of a trade were sponsored by the same broker, there will be two fill reports in the summary file.

The preferred embodiment saves two copies of the data described below to a removable medium for archiving and analysis. Wherever possible, the logging of events includes a date-time stamp with millisecond accuracy.

- System and Application Logs: The application and system logs on each machine are labeled and saved. The Log is preferably reset before begin-of-day.
- Configuration Audit: The details of a begin-of-day and end-of-day audit of the firmware configuration are recorded (NT Registry, application Config, etc.).
- ACT Messages: There shall be a separate log containing the details for all ACT messages. This log is preferably reset before begin-of-day.
- Orders & Trades: The order and trade tables are copied to removable storage at end-of-day. A separate log for the details on order state transitions is maintained. Log and tables are preferably reset before begin-of-day.
- Operation Activities: The operator activities affecting the behavior of the system are logged. The logging will be time stamped and include the identity of the operator. This log is preferably reset before begin-of-day.

All System Activity Logs and Daily Reports are preferably moved to permanent storage at the end of each trading day. System Activity Logs contain enough information to reconstruct the trading logic and pricing for each order and trade event, including time stamps required to resolve pricing disputes.

The system is preferably configured to automatically recover services in the event of an accidental failure, using processes based on the considerations below.

Loss of GUI. The GUI 20 is a required channel for Cloud9 Services. If Net Server 110 detects a loss of connectivity with the client, in the preferred embodiment all orders are automatically cancelled and the system generates an alert to help desk personnel with the phone number of any trader with canceled orders. The GUI 20 shows the order status as "cancel pending". On reconnecting, the order status is updated to "canceled". Traders can pull up a list of orders that were canceled as a result of the connection failure and re-activate these orders; the system will treat them as new orders and process them accordingly. In an alternate embodiment, users are enabled to select a configuration where their orders would not be canceled on loss of connectivity with the GUI; in this embodiment the user will call the Help Desk to cancel orders when the connection cannot be recovered.

Loss of FIX. FIX connectivity loss preferably does not cause the cancellation of orders, because FIX is not the channel through which executable orders are managed. The operator must be alerted upon loss of a FIX connection. Upon reconnecting, the FIX client will re-synchronize with the server in accordance with the FIX protocol requirements. In an alternate embodiment FIX can be used to enter executable orders in the system and said system supports a configuration enabling users to request that their orders be automatically canceled upon loss of the FIX connection.

Analytics server. If the Analytics Server 160 is out of service, the system in the preferred embodiment will continue to function but without the benefit of functions normally implemented by the Facilitator such as new active symbol messages or Contras Present messages. The GUI 20 will also fail to receive quote updates and BPR update messages. If the Analytics Server 160 cannot be brought back on line swiftly, system operators have instructions to place the system in an off-line state where it rejects any further order entry, but does not cancel existing orders. These solutions are described as an example of how a trading system such as that in the present invention addresses reliability issues, but other solutions will easily be apprehended by those skilled in the art. For example, an alternate approach is to consider the Analytics Server 160 as a vital service and automatically take the system off line and cancel all orders upon loss of service.

NetServer, Order Manager and Facilitator. These services are closely related to vital functions of the trading system. Failure of these services is therefore considered fatal in the preferred embodiment; the operator will attempt to cancel all orders in the execution engine, or these will be canceled automatically when loss of connectivity is detected. The Cloud9 system automatically goes in an off-line state upon detecting failure of any of these services.

The integrity of the system is constantly monitored by a System Management Console, which runs continuously on an independent system. If, at any time during the trading day, the integrity of the system becomes uncertain, the system automatically switches to an off-line mode. At this point all orders are cancelled. All further orders are declined until the system returns to a fully operational state.

System-Imposed Symbol Active Flag

In an alternate embodiment, the system automatically sets all watched securities to an active state at announced times and maintains these symbols active for a 15-minute window. For example, the system may set all watched symbols to an active state at 11:50 and hold them active until 12:05. This alternate embodiment with an active window helps focus the attention of traders around a given time, and allows traders to participate who would not feel comfortable with placing the first order that causes the symbol to become active. It also helps traders manage the space on their workstation screens, by limiting the amount of time during which they are expected to dedicate space to the GUI 20. Finally, by utilizing a call window that has already become known to traders as associated with block crosses thanks to the marketing presence of the POSIT® matching system, this alternate embodiment can leverage the fact that traders are already used to seeking a block crossing opportunity at this time and focus liquidity in Cloud9 for symbols where a plurality of traders are watching the GUI 20.

Upon termination of the active window, a symbol's activity state reverts back to what it would have been based upon the description of the preferred embodiment. Thus, if there are open or recently canceled orders in the system in a given symbol upon termination of said active window then said symbol will remain active; other symbols that have not seen order activity will revert to a "watched" status. As long as a symbol remains in an active status, traders can continually place new orders without this act causing the symbol to change activity state. For very liquid symbols, this can potentially lead to a symbol staying in an active state through the end of the trading day. While in this mode, the system will focus traders in price by means of the contras present flags, but there is no further need to focus in time.

Watched Symbol Flag

Figure 10:
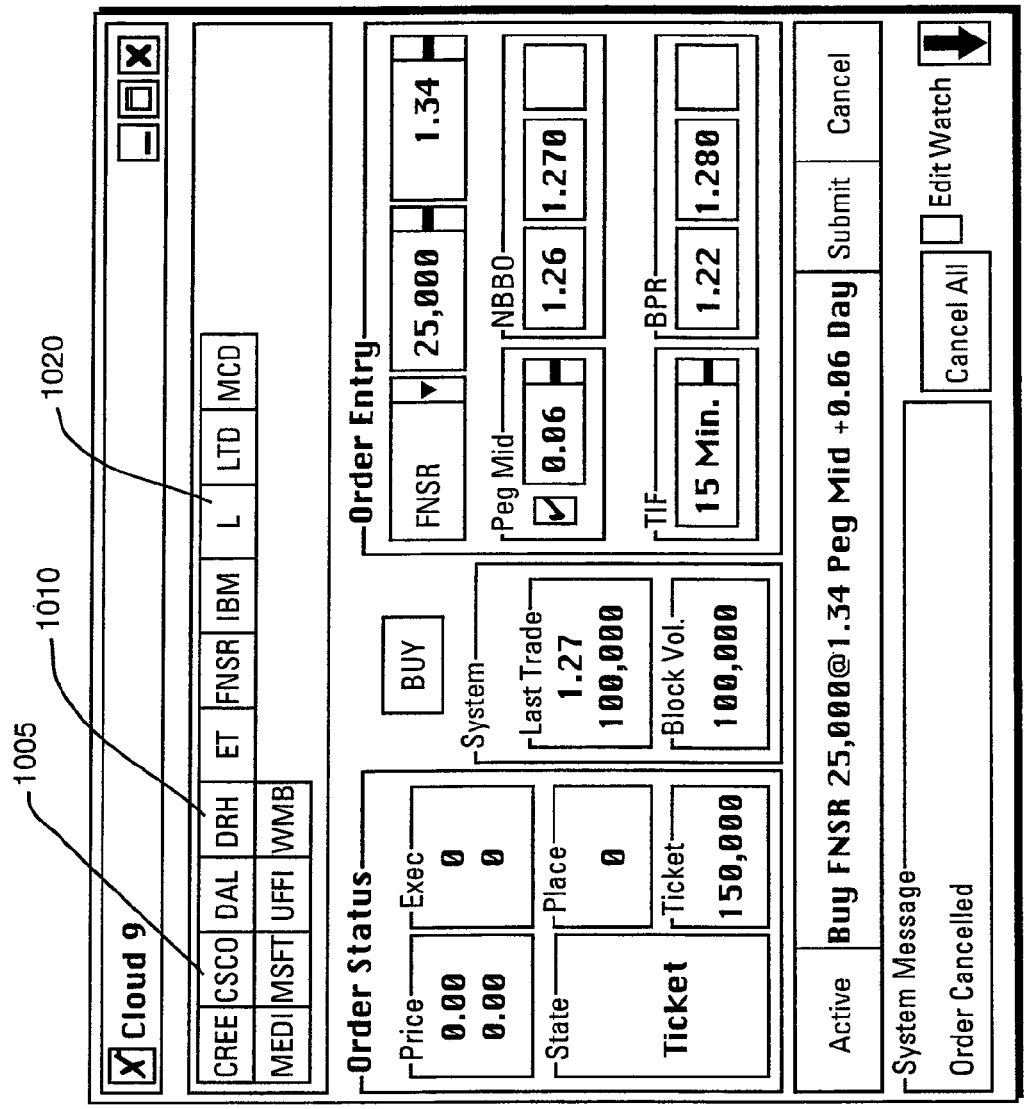
FIG. 10 depicts a preferred GUI wherein watched securities are identified.

In an alternate embodiment, the system is as in the preferred embodiment but additionally indicates to users when a symbol is being watched by at least two traders. If the symbol is on their own watch list, they will see when there is at least one other trader interested in the symbol. For example, the watched symbols that are on the trader's watch list appear in a gray-colored box 1020 on top of the user interface, similarly to the orange-colored active symbol flags 1005 and yellow-colored contras present flags 1010, as shown in FIG. 10.

The purpose is to provide the trader with conditioning information that increases the likelihood of a fill. The fill rate would be expected to be higher when the symbol is watched since at least one trader will see the symbol become active upon an order entry event.

Of course a trader who has a watched symbol on his or her own watch list can always find out if there are one or two other traders watching in addition to him, simply by removing the symbol from his watch list. To make the system more user-friendly, an alternate embodiment also shows the trader in this case whether there is one other trader watching, or two other traders. This can be done by means of an asterisk next to the watched symbol name to indicate when there is only one other trader watching.

In an alternate embodiment the system shows the user the number of traders that have this symbol on their watch at any time.

In counting the number of traders that are watching a security, the system preferably looks for traders that are in fact able to see an active symbol flag. In one embodiment this is implemented by counting only GUIs that are not minimized and are not detectably hidden behind another application. In another embodiment the GUI cannot be minimized without leaving a residual alert mechanism. For example the minimized bar in the tray at the bottom of the trader's screen will flash with the orange or yellow color when a new active symbol or contras present message is received, and show the symbol associated with the most recent such message.

In yet another alternate embodiment, the number of traders that watch this symbol is not displayed, but the trader can learn the number of parties watching upon entering an order. In this alternate embodiment where the trader does not know if a symbol is watched until submitting an order, the trader can also check an "auto-cancel" box to request that his order is automatically canceled if no other trader is watching the symbol, since no one in that case would be able to see the active symbol flag and fill rates would be exceedingly low. In another alternate embodiment the trader is enabled to select the minimum number of traders that should be watching, and if the actual number of watching traders is less have the order canceled automatically.

Alternate Embodiment with System-Generated Calls

A well-known problem with large block crossing systems is the low probability that a large buyer and large seller enter orders at the same time. Much of the present invention is directed to solving this problem after the first trader has entered an order; but it does not in itself provide guidance as to when this first participant should be most encouraged to place an order.

In an alternate embodiment, the system operates as described above and also generates system-generated "call" events that focus traders' interest at times when there is indication of both buy and sell interest in the security. In another alternate embodiment the active flags are not sent and the call is the only time focusing event. The call is preferably scheduled via an algorithm that determines when the likelihood of a fill is highest. It preferably does not utilize unbalanced trade information (such as revealing the existence of buy interest in absence of any seller), so as to avoid the perception of information leaks whereby traders would feel that the orders they have placed in the system are causing unwanted information events beyond their direct control.

The purpose of the call is to attract order entry from traders when the likelihood of a fill is greatest. For example, if the average fill rate for a first trader placing an order in a given security were 5%, the fill rate when a call is open in the security might be 10% or 15%; in contrast the fill rate when there is no call would be lower than 5%; with an overall average of 5% for a trader that places orders at random times independently of any calls.

Minimally, the system will generate calls to focus order entry in a security when traders are missing each other on both sides. Other opportunities for generating calls are outlined below. To avoid information leak issues, these calls will be reported together with the BPR updates rather than together with an order entry event. In an alternate embodiment they are issued on the half hour, to further increase the traders' focus.

| | Description | Type |
|---|---|---|
| Symbol | Primary market name for the security | CHAR[5] |
| TimeStamp | When the BPR was calculated | HHMMSSCC |
| QuoteTime | Time of last quote update prior to calculating the BPR | HHMMSSCC |
| LastSaleTime | Time of most recent tape print prior to calculating the BPR | HHMMSSCC |
| NationalBid | In whole cents | FLOAT.2 |
| NationalOffer | In whole cents | FLOAT.2 |
| BlockBid | In whole cents | FLOAT.2 |
| BlockOffer | In whole cents | FLOAT.2 |
| Call | ON/OFF | Boolean |

The algorithms to generate calls are preferably based upon the following principles.

Not triggered on order entry. Calls will be timed with BPR updates. This eliminates the fear of information leaks that would occur if a trader were to see his own order immediately cause a call.

1 Minute Minimum lifespan. Once a call has been initiated, it will stay open for a sufficient time to let traders react and respond to the call.

Two-sided. Calls will be issued only if there is evidence of block interest on both sides. This reduces potential gaming.

Not necessarily an order. Calls may be generated when there is no active order in the system. This again reduces gaming problems.

Undisclosed rules. Again, reduces gaming issues. Also allows the algorithm to be updated (within the context of the above rules), and tune it to maintain a reasonable frequency of calls.

The following data is preferably available for the purpose of deciding when calls should be generated.

Tickets with remaining quantity.
Open orders.
Expired orders.
Trades.
Block prints on the tape.
Repeated prints on the tape with unusually high volume.

Rules-Based Method for Issuing Calls.

A first alternate embodiment utilizes a rules-based approach for deciding when the call should be issued. The Activity Evaluation process is executed together with the BPR Update process, for each symbol.

If there isn't already a call, the rules given below are preferably applied to decide if a symbol should be called depending on activity in the system (orders, trades, etc.) and on the market. If any of the Boolean rules are true, the symbol will be called.

If a symbol is already called, has been called for at least <60>seconds (configurable global parameter), and there is no contras present flag in the security, the system preferably removes the call.

Rules that lead to a call are listed in the bullet points below.

An order was entered and has expired. Later, another order is entered on the contra side. At the next BPR refresh time, check whether a call has been posted in this symbol in the last 30 minutes (configurable ActiveMaxDelay1), and if not, post the call in this symbol together with the new BPR.

An order was entered and has expired. Later, a block print is detected on the tape (greater than 10000 shares or $250,000, again these are all configurable parameters), and the call has not been posted in the last 90 minutes in this symbol (configurable ActiveMaxDelay2).

Discretionary: a help desk operator types the symbol and clicks on a button.

An order was entered and a ticket exists on the contra side.

An order was entered in a symbol that has traded within the last <30> minutes.

A resident order is priced passively and a new order has arrived within the BPR.

A resident sell order is within the BPR and repeated prints are detected on the tape indicating aggregate buys at the offer for a block size.

The above list is intended for illustration and is not intended to be exhaustive. Other rules that could be used to identify when there is a greater likelihood of a trade will easily be apprehended by those skilled in the art.

Score Function Method for Issuing Calls.

Another alternate embodiment with calls utilizes a score function to determine when to generate a call, as described next.

The Call Evaluation process is executed together with the BPR Update process, per symbol. If there is not currently a call in this symbol, the system calculates both an activity score and threshold for the symbol, as described below. If the score exceeds the threshold, the system preferably generates a call for this symbol.

If a symbol is already called, has been called for at least <60> seconds (configurable global parameter), and there is no contras present flag in the security, the system preferably removes the call.

The system preferably calculates the score function via two steps.

Step 1: compute the Buyside Interest and Sellside Interest in the security by adding weights associated with the following conditions.

OpenOrderCondition. Buy (sell) order currently open and priced within the BPR.

PassiveOrderCondition. Buy (sell) order currently open but priced more passive than the BPR.

ExpiredOrderCondition. Buy (sell) order expired since symbol was last active.

TicketCondition. Buy (sell) ticket with remaining quantity.

BlockTapeCondition. Large Block Fill on Cloud9 since symbol was last active.

MarketPrintCondition. Block print on the tape for at least <BlockQty=10000> shares or <BlockValue=$250,000>, printed above (below) the midpoint, having taken place since the last BPR update.

RandomRefreshCondition. Repeated prints above (below) the midpoint since the last BPR update with total quantity above <BlockQty=10000> shares or <BlockValue=$250,000>, at a rate that exceeds <LiquidityRatio=2> times the average volume for the security.

WatchListCount. Number of traders that have this symbol on their watch lists.

The table below gives an example of a reasonable configuration for the weights.

| | Description | Weight |
|---|---|---|
| OpenOrderCondition | Order within BPR | 20 |
| PassiveOrderCondition | Passive order | 10 |
| ExpiredOrderCondition | Expired order | 5 |
| TicketCondition | Ticket | 4 |
| BlockTapeCondition | Cloud9 trade | 3 |

| | Description | Weight |
|---|---|---|
| MarketPrintCondition | Big print on the tape | 2 |
| RandomRefreshCondition | Buy (sell) pressure on the market | 1 |
| WatchListCount | Number of traders with this symbol on watch. | INT |

Step 2: Compute the symbol activity score as the product of the Buyside Interest times the SellSide Interest.

The system preferably calculates the threshold as follows. The threshold is equal to zero if the symbol has never been called. If the symbol has previously been called, the threshold for this symbol will be equal to an exponential function of the time since the last call expired in this symbol:

$$\text{Threshold} = \text{MaxThreshold} * \text{EXP}(-\text{Beta} * \text{TimeDelay})$$

The parameters MaxThreshold and Beta are preferably configurable per security.

Alternate Embodiment with Targeted Active Symbol Messages

In an alternate embodiment, the system operates as described above except that the active symbol message is not sent to all traders who have placed the symbol on their watch list; instead, the flag is only sent to traders that have provided certified trading interest information indicating a likely interest in either buying or selling a large block of this security. For example, such certified trading interest information may be a drop copy of execution reports that brokers issue following each trade, and the selection criteria may be that the firm has bought net (or sold net) at least 10,000 shares of stock within the last 30 minutes. Other examples are described extensively in the following co-pending U.S. patent application Ser. Nos. 09/585,049, filed Jun. 1, 2000; 09/750,768, filed Dec. 29, 2000; and 09/870,845, filed May 31, 2001, the entire contents of each of which are incorporated herein by reference.

Alternate Embodiment with a System-Proposed Match Price

In the preferred embodiment described above, the traders themselves set price conditions on their order that will determine the execution price with no further intervention on their part.

In their current workflow, Institutional traders are accustomed to sending market orders to brokers and accepting or rejecting prices that the broker may propose for executing a large block. In this sense, one could say that the Institutional trader is a price "taker," not a price "maker."

Electronic trading systems suffer from the problem that the first party entering an order is writing the price that others may elect to take or not take; thus leading to an adverse selection problem where their prices will tend to get taken when they committed a mistake and offered a too aggressive price. Attempts to reverse price priority by giving the standing order improvement to the second order's limit, or having the two meet half way if the prices cross, don't work well because such rules only cause the second order to start with a passive order and then progressively increase price aggression until a match occurs at the standing order's limit.

The purpose of the alternate embodiment described below is to solve this problem by having the system generate a proposed match price that is not sensitive to the prices of existing orders in the system.

In this alternate embodiment of the present invention, the system performs as described above for limit orders and pegged orders, but additionally enables traders to enter a new order type that we will refer to herein as a "Market Order". A market order may optionally also have an absolute limit price, which in turn may be fixed or pegged to a market indicator such as the midpoint of the National Best Bid of Offer.

An incoming market order will be handled as follows.

Upon receiving a market order, if there is no contra order currently residing within the system, it simply stores the market order. If there is a resident contra order, the system will randomly determine a possible trade price by choosing a price within the BPR with a statistical distribution, such as, for example, a flat distribution (the flat distribution being that wherein all price points within the BPR are equally likely to be selected). In another example, the proposed trade price is sensitive to orders in the system, and the users submit to fair arbitration by allowing the system to use order information to determine a fair price. For example, such an embodiment can generate a random price based on a distribution that is not flat but piecewise flat, with two flat segments above and below the BPR Midpoint, to give greater probabilities to the prices below the BPR midpoint when there are more sell orders than buy orders in the system, or vice versa if there are more buyers. For example, the probability of prices below the BPR Midpoint can be taken to be equal to P(Below Midpoint)=1/(1+EXP(Gamma X)), where Gamma is a positive number such as 2, and X is the relative difference between buyer shares and seller shares priced within the BPR: X=(BuyQuantity−SellQuantity)/(BuyQuantity+SellQuantity). Thus, X→1 if there is more buy interest than sell interest, and X→−1 in the opposite case. These examples of methods to generate prices are intended for the purpose of illustration and not as an exhaustive list; other mechanisms to generate a price can easily be apprehended by those skilled in the art.

Having determined a possible trade price, the system will proceed to determine the feasibility of a trade at this price according to the following logic.

1. If the randomly generated price is within the limits of both orders, the trade is executed at this price with no further input needed from either player.
2. If neither order is able to accept the proposed randomly-generated price, this price is proposed to both traders, who are then given a time window in which to accept or decline the price. For example, the time window can be synchronous with the BPR refresh time, or a minimum of 15 seconds, whichever is longer. At the expiration of this time window a new randomly-generated price is produced together with a new BPR, and this process continues as long as there are orders on both sides within the BPR.
3. If one order's limit price is sufficiently aggressive to accept the proposed trade price but the other is not, the price of the order that was not sufficiently aggressive to trade will be proposed to the more aggressive trader, and the randomly-generated price will be shown to the less aggressive trader. Neither trader will know whether the price they are looking at is the other trader's limit or the randomly generated system price. At the expiration of a time window, a new price is generated and the process continues as described as long as there are orders on both sides within the BPR.

In an alternate embodiment, when only one trader's limit overlaps the system-generated price, this trader has the option of accepting the other's limit or of proposing a counter offer to the less aggressive trader. In this embodiment, the less aggressive trader does not see a price until the first trader has taken action, or a 30-second time window expires. The more aggressive trader may cancel his order within this 30-second window without having at any point revealed its existence to the other trader. If the first trader takes no action, the system automatically shows the second and less aggressive trader the system-generated price after 30 seconds. This delay overrides the immediate display of a contras present flag to resident orders of the preferred embodiment.

Competition Present Flag

In an alternate embodiment of the present invention, the system performs as in the preferred embodiment but in addition provides a mechanism for traders to know when there is competition to buy (sell) the security, enticing them to increase their price aggression and thereby also facilitating the process of discovering a fair price for a trade.

In a first alternate embodiment with the competition present flag, the system simply lets each trader with an order in the system that is already seeing a contra present flag know whether there are other orders on the same side.

In a second alternate embodiment with the competition present flag, the system performs as in the first alternate embodiment just described, but additionally the trader with the lower matching priority based price and time priority ranking is enabled to see that the other trader has a higher matching priority; this trader is then induced to increase the price aggression on his order. If this becomes the new highest matching priority order, the other trader will in turn be allowed to see that his price is no longer the best. This process continues as long as there are multiple orders on the same side in a context and one or more contras are present.

Working Orders and Integration with Third Party Execution Systems

In an alternate embodiment, the system operates as described above but additionally users are enabled to request that their orders be worked on the market while waiting for a match within Cloud9.

Users that request a working order option are preferably required to enter an order quantity that is greater than the minimum block quantity. The additional size will be dispatched to be worked by an automated process that automatically places small slices on the regular market, in the manner known in the art as "random refresh" orders. Several such automated processes are available on the market today; some that are known in the art are random refresh algorithms that place a small quantity of shares at the best price on the market, and whenever said small quantity is exhausted, generates a new small order to be placed at the new best price. The refreshed quantity is chosen at random between a minimum and maximum size, for example between 500 and 900 shares. In another example the order is refreshed after a random delay of a few seconds. Other more sophisticated algorithms are commercially available to automate the execution of an order through its reduction to small pieces that are executed independently, such as ITG's Quantex. Other destinations, such as NyFIX Millennium, enable completely hidden orders to intercept order flow that was on its way to a third market destination.

The alternate embodiment described herein manages the order across one or more working order destinations in addition to Cloud9. In one version of this embodiment the system splits the order into several chunks, one for the Large Block Quantity is placed on Cloud9; others for a system-configurable quantity (for example, 5000 shares) are routed to external destinations that have the capability of working the order. Whenever a destination has completed its block, the system determines if there is residual quantity besides that which is already placed on execution systems, and if so sends the lesser of the system-configurable quantity or the available residue to the destination that has completed its block. When one external destination has completed a chunk and no residual quantity remains, but there are still incomplete blocks on other market destinations, the incomplete block that has spent the longest amount of time without receiving a fill is canceled and re-routed to the destination that reports having completed its block. When there are no further incomplete blocks anywhere except for the Large Block Quantity order on Cloud9; the system sends a message to the user's GUI 20 to notify that the working order component has been completed. The trader may then place additional shares to resume working the order, or convert the Large Block Quantity itself into a working order.

In this alternate embodiment, the system preferably removes the order from consideration in assigning flags when the quantity remaining in Cloud9 has dropped below the Large Block Quantity. In another alternate embodiment, the remaining size in Cloud9 can fall below the Large Block Quantity and maintain the order's effect to keep the active symbol flag. In this embodiment, a second party that has also selected the working order option may receive a partial fill against this Cloud9 order if the prices were to cross (for example, if one order is pegged to the NBBO Midpoint and the other is a Limit Order). If the Cloud9 Limit prices of two working orders cross, the system preferably attempts to pull back all orders routed to third party destinations, to maximize the size that can be traded internally. Residues from this match event are subsequently reassigned to external destinations. In yet another alternate embodiment, any trader may check a box to specify that they are willing to receive partial fills from the residue on a working order, and may optionally specify a minimum quantity that such fills must satisfy.

In another alternate embodiment the orders entered within the system are placed in the execution engine in a suspended status while the liable block order is placed at a destination where a fill might be expected. For example, the block can be placed on POSIT® for a scheduled cross while it remains in a suspended status on Cloud9. The system preferably maintains the effects of the suspended order on Cloud9 for purposes of the active symbol flags. Upon entry of a contra order, the system of this alternate embodiment preferably pulls back the liability by attempting to cancel the externalized order. When this cancel is successful (the order has not already been filled); the contras present flags are sent as in the preferred embodiment.

While the embodiments shown and described herein are fully capable of achieving the objects of the subject invention, it is evident that numerous alternatives, modifications, and variations will be apparent to those skilled in the art in light of the foregoing description. These alternatives, modifications, and variations are within the scope of the subject invention, and it is to be understood that the embodiments described herein are shown only for the purpose of illustration and not for the purpose of limitation.

What is claimed is:

1. A method for facilitating trading of securities over a computer system, comprising the steps of:
    electronically receiving a first order for a security from a first user, along with a price for said first order;
    calculating with a processing system comprising one or more processors a block price range for said security, said block price range having an upper end and a lower end;
    determining with said processing system that said first order is reasonably priced, wherein the determining is based on whether said price satisfies the following conditions:
    for a sell order, said price is equal to or lower than said upper end of said block price range, and
    for a buy order, said price is equal to or higher than said lower end of said block price range;
    transmitting to a second user an electronic notification that a reasonably priced order for said security is present, but without notifying said second user of a side of the order;
    receiving a second order from said second user, along with a price for said second order, wherein said second order is contra to said first order, such that if said first order is a buy order, said second order is a sell order, and if said first order is a sell order, said second order is a buy order, and wherein said second order is reasonably priced but does not cross said first order;
    transmitting an electronic contra order notification to said second user after said second order is received, said electronic contra order notification indicating that a reasonably priced contra order is active within the computer system;
    receiving a third order, along with a price for said third order, from said second user, said third order being contra to said first order, such that if said first order is a buy order, said third order is a sell order, and if said first order is a sell order, said third order is a buy order, and wherein said third order crosses said first order; and
    executing a trade comprising said first order and said third order,
    wherein said second user receives said electronic contra order notification only after a second predetermined time period has lapsed after said second order is received, and
    wherein said step of calculating the block price range comprises predicting a price range likely to occur within a first predetermined time period.

2. The method as in claim 1, wherein said second user receives said contra order notification immediately after said second order is received.

3. The method as in claim 1, wherein said step of calculating the block price range is based on recent or current market prices.

4. The method as in claim 1, wherein said step of calculating the block price range is based on recent volatility in said security.

5. The method as in claim 1, wherein said block price range is recalculated at intervals of time approximately equal to said first predetermined time period.

6. The method as in claim 1, further comprising disallowing from being processed by the computer system any order that is not a multiple of a block quantity predetermined by the computer system.

7. An electronic system for facilitating securities trading, comprising:
    one or more processors configured to:
    receive a first order from a first user, along with a price for said first order;
    calculate a block price range for said security, said block price range having an upper end and a lower end;
    determine whether said first order is reasonably priced, based on whether said price satisfies conditions of:
    for a sell order, said price is equal to or lower than said upper end of said block price range, or
    for a buy order, said price is equal to or higher than said lower end of said block price range;
    transmit to a second user an electronic notification that a reasonably priced order for said security is present, but without notifying said second user of a side of the order;
    receive a second order, along with a price for said second order, from said second user, wherein said second order is contra to said first order, such that if said first order is a buy order, said second order is a sell order, and if said first order is a sell order, said second order is a buy order, and wherein said second order is reasonably priced but does not cross said first order;

transmit an electronic contra order notification to said second user after said second order is received, said electronic contra order notification indicating that a reasonably priced contra order is active within the electronic system;

receive a third order, along with a price for said third order, from said second user, said third order being contra to said first order, such that if said first order is a buy order, said third order is a sell order, and if said first order is a sell order, said third order is a buy order, and wherein said third order crosses said first order; and execute a trade comprising said first order and said third order wherein said second user receives said electronic contra order notification only after a second predetermined time period has lapsed after said second order is received, and wherein said step of calculating the block price range comprises predicting a price range likely to occur within a first predetermined time period.

8. The system as in claim 7, wherein said second user receives said contra order notification immediately after said second order is received.

9. The system as in claim 7, wherein said step of calculating the block price range is based on recent or current market prices.

10. The system as in claim 7, wherein said step of calculating the block price range is based on recent volatility in said security.

11. The system as in claim 7, wherein said block price range is recalculated at intervals of time approximately equal to said first predetermined time period.

12. The system as in claim 7, wherein the one or more processors are further configured to disallow from being processed by the electronic system any order that is not a multiple of a block quantity predetermined by the electronic system.

* * * * *